(12) United States Patent
Xu et al.

(10) Patent No.: US 10,430,020 B2
(45) Date of Patent: Oct. 1, 2019

(54) METHOD FOR OPENING FILE IN FOLDER AND TERMINAL

(71) Applicant: Huawei Technologies Co., Ltd., Shenzhen (CN)

(72) Inventors: Jie Xu, Shanghai (CN); Zhiyan Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 15/106,750

(22) PCT Filed: Dec. 20, 2013

(86) PCT No.: PCT/CN2013/090066
§ 371 (c)(1),
(2) Date: Jun. 20, 2016

(87) PCT Pub. No.: WO2015/089820
PCT Pub. Date: Jun. 25, 2015

(65) Prior Publication Data
US 2016/0313893 A1    Oct. 27, 2016

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC ............... G06F 3/04842; G06F 3/0482; G06F 2201/81; G06F 3/04817; G06F 3/048
See application file for complete search history.

(56) References Cited

U.S. PATENT DOCUMENTS 9,933,922 B2 * 4/2018 Ye ....................... G06F 3/04842
2006/0136406 A1   6/2006 Reponen
(Continued)

FOREIGN PATENT DOCUMENTS

CN        101192230 A    6/2008
CN        101957722 A    1/2011
(Continued)

OTHER PUBLICATIONS

Graig et al., The Mobile Tree Browser a Space Filling Information Visualization for Browsing Labelled Hierarchies on Mobile Devices; year published 2015, IEEE, 8 pages.*

(Continued)

*Primary Examiner* — Linh K Pham
(74) *Attorney, Agent, or Firm* — Fish & Richardson P.C.

(57) ABSTRACT

The present invention provides a method for opening a file in a folder, including: obtaining an operation performed on an icon area of a folder; determining whether the operation is performed on a preset area in the icon area of the folder, where the preset area displays information about a preset file in the folder; and if the operation is performed on the preset area in the icon area of the folder, opening the preset file. The present invention further provides a corresponding terminal. In embodiments of the present invention, an icon of a file in the folder is displayed on an icon of the folder. When the folder is not opened, a user may directly view, from the icon of the folder, an icon of a file that needs to be opened, so as to directly implement a trigger operation of opening the file, which is simple and convenient.

8 Claims, 20 Drawing Sheets

(51) Int. Cl.
*G06F 3/0484* (2013.01)
*G06F 3/0486* (2013.01)
*G06F 3/0482* (2013.01)
*G09G 5/00* (2006.01)

(52) U.S. Cl.
CPC .......... *G06F 3/0484* (2013.01); *G06F 3/0486* (2013.01); *G06F 3/04845* (2013.01); *G09G 5/00* (2013.01); *G09G 2340/045* (2013.01); *G09G 2340/0464* (2013.01); *G09G 2340/145* (2013.01)

(56) References Cited

U.S. PATENT DOCUMENTS

| | | | |
|---|---|---|---|
| 2006/0165380 A1* | 7/2006 | Tanaka | G11B 27/34 386/227 |
| 2007/0061745 A1 | 3/2007 | Anthony et al. | |
| 2009/0064035 A1* | 3/2009 | Shibata | G06F 3/0481 715/803 |
| 2009/0106666 A1* | 4/2009 | Nomura | G06F 17/30126 715/748 |
| 2009/0288044 A1 | 11/2009 | Matthews et al. | |
| 2010/0017435 A1 | 1/2010 | Anno | |
| 2010/0088630 A1 | 4/2010 | Morris | |
| 2010/0162179 A1 | 6/2010 | Porat | |
| 2010/0205566 A1 | 8/2010 | Matoba | |
| 2010/0281374 A1 | 11/2010 | Schulz et al. | |
| 2011/0252346 A1* | 10/2011 | Chaudhri | G06F 3/04817 715/765 |
| 2011/0252375 A1* | 10/2011 | Chaudhri | G06F 3/04817 715/835 |
| 2011/0279388 A1* | 11/2011 | Jung | G06F 3/04883 345/173 |
| 2011/0289448 A1 | 11/2011 | Tanka | |
| 2012/0030623 A1 | 2/2012 | Hoellwarth | |
| 2012/0052918 A1 | 3/2012 | Yang | |
| 2012/0192110 A1 | 7/2012 | Wu | |
| 2013/0038634 A1 | 2/2013 | Yamada et al. | |
| 2013/0205201 A1* | 8/2013 | Tsai | G06F 3/0483 715/249 |
| 2013/0234982 A1* | 9/2013 | Kang | G06F 3/044 345/174 |
| 2013/0238724 A1 | 9/2013 | Cunningham | |
| 2013/0311949 A1* | 11/2013 | Shimadate | G06F 3/0483 715/838 |
| 2014/0096083 A1 | 4/2014 | Kim et al. | |
| 2015/0074603 A1* | 3/2015 | Abe | G06F 3/0482 715/823 |
| 2016/0179310 A1 | 6/2016 | Chaudhri et al. | |
| 2016/0370980 A1 | 12/2016 | Han et al. | |

FOREIGN PATENT DOCUMENTS

| | | |
|---|---|---|
| CN | 102033710 A | 4/2011 |
| CN | 102184072 A | 9/2011 |
| CN | 102289325 A | 12/2011 |
| CN | 102301346 A | 12/2011 |
| CN | 102364438 A | 2/2012 |
| CN | 102387246 A | 3/2012 |
| CN | 102449589 A | 5/2012 |
| CN | 102681991 A | 9/2012 |
| CN | 102768606 A | 11/2012 |
| CN | 103019522 A | 4/2013 |
| CN | 103034396 A | 4/2013 |
| CN | 103064944 A | 4/2013 |
| CN | 103324387 A | 9/2013 |
| CN | 103365393 A | 10/2013 |
| CN | 103713802 A | 4/2014 |
| CN | 103761022 A | 4/2014 |
| EP | 2284670 A1 | 2/2011 |
| EP | 2426898 A2 | 3/2012 |
| JP | 2001109877 A | 4/2001 |
| JP | 2005004419 A | 1/2005 |
| JP | 2008096725 A | 4/2008 |
| JP | 2008276277 A | 11/2008 |
| JP | 2009508217 A | 2/2009 |
| JP | 2010026766 A | 2/2010 |
| JP | 2010182004 A | 8/2010 |
| JP | 2010187096 A | 8/2010 |
| JP | 2012155698 A | 8/2012 |
| JP | 2013218689 A | 10/2013 |
| KR | 20070086191 A | 8/2007 |
| KR | 20080042871 A | 5/2008 |
| KR | 20120022131 A | 3/2012 |
| RU | 2491608 C2 | 8/2013 |

OTHER PUBLICATIONS

Chinese Office Action issued in Chinese Application No. 201480036815.3 dated Oct. 23, 2018, 8 pages.

* cited by examiner

---

Obtain an operation that is used to shrink an icon of a folder, where a preset area in an icon area of the folder displays information about a preset file in the folder — 301

Subtract, according to the obtained operation that is used to shrink the icon of the folder, the preset area to shrink the icon of the folder — 302

METHOD FOR OPENING FILE IN FOLDER AND TERMINAL

CROSS-REFERENCE TO RELATED APPLICATION

This application is a National Stage of International Patent Application No. PCT/CN2013/090066, filed on Dec. 20, 2013, which is hereby incorporated by reference in its entirety.

TECHNICAL FIELD

The present invention relates to the field of communications technologies, and in particular, to a method opening a file in a folder and a terminal.

BACKGROUND

Generally, a folder is set on a terminal device, for example, on a user interface of a smartphone or a computer, and a user may manage an application or a file by using the folder. When the user needs to open a file in the folder, the user can view an icon of the target file only by first clicking or tapping an icon of the folder to open the folder, and then can open the target file only by finding the icon of the target file and clicking the icon of the target file. The file herein includes an application on the terminal device. That is, in the prior art, to open a file in a folder, a terminal can open the target file only by first obtaining an operation of clicking the folder by the user to open the folder, and then obtaining operations of selecting and opening the target file. Therefore, when a folder is not opened, the user cannot directly view a target file in the folder by using the prior art, and cannot directly open the target file.

SUMMARY

Embodiments of the present invention provide a method for opening a file in a folder, and a terminal. The embodiments of the present invention allow a user to view an icon of a file in a folder when the folder is not opened, and to directly open the viewed file.

According to a first aspect of the present invention, a method for opening a file in a folder is provided, including:

obtaining an operation performed on an icon area of a folder;

determining whether the operation is performed on a preset area in the icon area of the folder, where the preset area displays information about a preset file in the folder; and if the operation is performed on the preset area in the icon area of the folder, opening the preset file.

With reference to the first aspect of the present invention, in a first possible implementation manner of the first aspect, the method further includes:

if the operation is performed on an icon area of the folder except the preset area, opening the folder.

With reference to the first aspect of the present invention or the first possible implementation manner of the first aspect, in a second possible implementation manner of the first aspect, the icon area of the folder includes a plurality of the preset areas that respectively and correspondingly display information about a plurality of the preset files.

With reference to the first aspect of the present invention, or the first or the second possible implementation manner of the first aspect, in a third possible implementation manner of the first aspect, before the obtaining an operation performed on an icon area of a folder, the method further includes:

detecting available space around a user interface position on which an icon of the folder is located;

extending the icon of the folder toward the available space when the detected available space is greater than or equal to a set threshold, where an extended icon area of the folder includes the preset area; and displaying, in the preset area, the information about the preset file.

With reference to the third possible implementation manner of the first aspect of the present invention, in a fourth possible implementation manner of the first aspect, the detecting available space around a user interface position on which an icon of the folder is located includes:

detecting available space on two sides of a landscape orientation or a portrait orientation of a user interface position on which the folder is located.

With reference to the third or the fourth possible implementation manner of the first aspect of the present invention, in a fifth possible implementation manner of the first aspect, the extending the icon of the folder toward the available space when the detected available space is greater than or equal to a set threshold includes:

when the detected available space is greater than or equal to the set threshold, determining whether the folder includes the preset file; and if it is determined that the folder includes the preset file, extending the icon of the folder toward the available space.

With reference to any one of the third to the fifth possible implementation manners of the first aspect of the present invention, in a sixth possible implementation manner of the first aspect, before the detecting available space around a user interface position on which an icon of the folder is located, the method further includes:

obtaining an operation that is used to extend the icon of the folder; and the detecting available space around a user interface position on which an icon of the folder is located includes:

detecting, according to the operation that is used to extend the icon of the folder, the available space around the user interface position on which the icon of the folder is located.

With reference to the sixth possible implementation manner of the first aspect of the present invention, in a seventh possible implementation manner of the first aspect, before the obtaining an operation that is used to extend the icon of the folder, the method further includes:

obtaining an operation that is used to make the icon of the folder enter a to-be-operated state, so that the icon of the folder enters the to-be-operated state.

With reference to the sixth or the seventh possible implementation manner of the first aspect of the present invention, in an eighth possible implementation manner of the first aspect, the obtaining an operation that is used to extend the icon of the folder includes:

obtaining an operation that is used to extend, in a landscape orientation, the icon of the folder; and the extending the icon of the folder toward the available space includes:

extending, in a landscape orientation, the icon of the folder according to the obtained operation that is used to extend, in a landscape orientation, the icon of the folder.

With reference to the sixth or the seventh possible implementation manner of the first aspect of the present invention, in a ninth possible implementation manner of the first aspect, the obtaining an operation that is used to extend the icon of the folder includes:

obtaining an operation that is used to extend, in a portrait orientation, the icon of the folder; and the extending the icon of the folder toward the available space includes:

extending, in a portrait orientation, the icon of the folder according to the obtained operation that is used to extend, in a portrait orientation, the icon of the folder.

According to a second aspect of the present invention, a method for processing an icon of a folder is provided, including:

obtaining an operation that is used to shrink an icon of a folder, where a preset area in an icon area of the folder displays information about a preset file in the folder; and subtracting, according to the obtained operation that is used to shrink the icon of the folder, the preset area to shrink the icon of the folder.

With reference to the second aspect of the present invention, in a first possible implementation manner of the second aspect, the obtaining an operation that is used to shrink an icon of a folder includes:

obtaining an operation performed on the preset area, where the operation performed on the preset area is used to shrink the icon of the folder.

With reference to the second aspect of the present invention or the first possible implementation manner of the second aspect, in a second possible implementation manner of the second aspect, the obtaining an operation that is used to shrink an icon of a folder includes:

obtaining an operation that is used to shrink, in a landscape orientation, the icon of the folder; and the subtracting, according to the obtained operation that is used to shrink the icon of the folder, the preset area includes:

subtracting the preset area according to the obtained operation that is used to shrink, in a landscape orientation, the icon of the folder.

With reference to the second aspect of the present invention or the first possible implementation manner of the second aspect, in a third possible implementation manner of the second aspect, the obtaining an operation that is used to shrink an icon of a folder includes:

obtaining an operation that is used to shrink, in a portrait orientation, the icon of the folder; and the subtracting, according to the obtained operation that is used to shrink the icon of the folder, the preset area includes:

subtracting the preset area according to the obtained operation that is used to shrink, in a portrait orientation, the icon of the folder.

With reference to the second aspect of the present invention or the first possible implementation manner of the second aspect, in a fourth possible implementation manner of the second aspect, the obtaining an operation that is used to shrink an icon of the folder includes:

obtaining a sliding operation of sliding from the preset area to an icon area of the folder except the preset area; and the subtracting, according to the obtained operation that is used to shrink the icon of the folder, the preset area includes:

shrinking the icon area of the folder according to the sliding operation, where a shrunk icon area of the folder is an area obtained by subtracting the preset area from the icon area, before the shrinking, of the folder.

According to a third aspect of the present invention, a terminal is provided, including:

an obtaining unit, configured to obtain an operation performed on an icon area of a folder;

a determining unit, configured to determine whether the operation obtained by the obtaining unit is performed on a preset area in the icon area of the folder, where the preset area displays information about a preset file in the folder; and an opening unit, configured to: if the determining unit determines that the operation is performed on the preset area in the icon area of the folder, open the preset file.

With reference to the third aspect of the present invention, in a first possible implementation manner of the third aspect, the opening unit is further configured to: if the determining unit determines that the operation is performed on an icon area of the folder except the preset area, open the folder.

With reference to the third aspect of the present invention or the first possible implementation manner of the third aspect, in a second possible implementation manner of the third aspect, the obtaining unit is configured to obtain the operation performed on the icon area of the folder, where the icon area of the folder includes a plurality of the preset areas that respectively and correspondingly display information about a plurality of the preset files.

With reference to the third aspect of the present invention, or the first or the second possible implementation manner of the third aspect, in a third possible implementation manner of the third aspect, the terminal further includes:

a detection unit, configured to: before the obtaining unit obtains the operation performed on the icon area of the folder, detect available space around a user interface position on which the icon of the folder is located;

a extension unit, configured to: when the available space detected by the detection unit is greater than or equal to a set threshold, extend the icon of the folder toward the available space, where an extended icon area of the folder includes the preset area; and a display unit, configured to: after the extension unit extends the icon of the folder toward the available space, display, in the preset area, the information about the preset file.

With reference to the third possible implementation manner of the third aspect of the present invention, in a fourth possible implementation manner of the third aspect, that the detection unit is configured to: before the obtaining unit obtains the operation performed on the icon area of the folder, detect the available space around the user interface position on which the icon of the folder is located includes:

configured to: before the obtaining unit obtains the operation performed on the icon area of the folder, detect available space on two sides of a landscape orientation or a portrait orientation of a user interface position on which the folder is located.

With reference to the third or the fourth possible implementation manner of the third aspect of the present invention, in a fifth possible implementation manner of the third aspect, that the extension unit is configured to: when the available space detected by the detection unit is greater than or equal to the set threshold, extend the icon of the folder toward the available space includes:

configured to: when the available space detected by the detection unit is greater than or equal to the set threshold, determine whether the folder includes the preset file, where the information about the preset file is used to be displayed in the preset area; and if it is determined that the folder includes the preset file, extend the icon of the folder toward the available space.

With reference to any one of the third to the fifth possible implementation manners of the third aspect of the present invention, in a sixth possible implementation manner of the third aspect, the obtaining unit is further configured to: before the detection unit detects the available space around the user interface position on which the icon of the folder is located, obtain an operation that is used to extend the icon of the folder; and that the detection unit is configured to detect the available space around the user interface position on which the icon of the folder is located includes:

configured to detect, according to the operation that is used to extend the icon of the folder and obtained by the obtaining unit, the available space around the user interface position on which the icon of the folder is located.

With reference to the sixth possible implementation manner of the third aspect of the present invention, in a seventh possible implementation manner of the third aspect, the obtaining unit is further configured to: before obtaining the operation that is used to extend the icon of the folder, obtain an operation that is used to make the icon of the folder enter a to-be-operated state, so that the icon of the folder enters the to-be-operated state.

With reference to the sixth or the seventh possible implementation manner of the third aspect of the present invention, in an eighth possible implementation manner of the third aspect, that the obtaining unit is configured to obtain the operation that is used to extend the icon of the folder includes:

configured to obtain an operation that is used to extend, in a landscape orientation, the icon of the folder; and that the extension unit is configured to extend the icon of the folder toward the available space includes:

configured to extend, in a landscape orientation, the icon of the folder according to the obtained operation that is used to extend, in a landscape orientation, the icon of the folder.

With reference to the sixth or the seventh possible implementation manner of the third aspect of the present invention, in a ninth possible implementation manner of the third aspect, that the obtaining unit is configured to obtain a trigger operation that is used to extend the icon of the folder includes:

configured to obtain an operation that is used to extend, in a portrait orientation, the icon of the folder; and that the extension unit is configured to extend the icon of the folder toward the available space includes:

configured to extend, in a portrait orientation, the icon of the folder according to the obtained operation that is used to extend, in a portrait orientation, the icon of the folder.

According to a fourth aspect of the present invention, a terminal is provided, including:

an obtaining unit, configured to obtain an operation that is used to shrink an icon of a folder, where a preset area in an icon area of the folder displays information about a preset file in the folder; and an extension and shrinking unit, configured to subtract, according to the operation that is used to shrink the icon of the folder and obtained by the obtaining unit, the preset area to shrink the icon of the folder.

With reference to the fourth aspect of the present invention, in a first possible implementation manner of the fourth aspect, that the obtaining unit is configured to obtain the operation that is used to shrink the icon of the folder includes:

configured to obtain an operation performed on the preset area, where the operation performed on the preset area is used to shrink the icon of the folder.

With reference to the fourth aspect of the present invention or the first possible implementation manner of the fourth aspect, in a second possible implementation manner of the fourth aspect, that the obtaining unit is configured to obtain the operation that is used to shrink the icon of the folder includes:

configured to obtain an operation that is used to shrink, in a landscape orientation, the icon of the folder; and that the extension and shrinking unit is configured to subtract, according to the operation that is used to shrink the icon of the folder and obtained by the obtaining unit, the preset area includes:

configured to subtract the preset area according to the operation that is used to shrink, in a landscape orientation, the icon of the folder and obtained by the obtaining unit.

With reference to the fourth aspect of the present invention or the first possible implementation manner of the fourth aspect, in a third possible implementation manner of the fourth aspect, that the obtaining unit is configured to obtain the operation that is used to shrink the icon of the folder includes:

configured to obtain an operation that is used to shrink, in a portrait orientation, the icon of the folder; and that the extension and shrinking unit is configured to subtract, according to the operation that is used to shrink the icon of the folder and obtained by the obtaining unit, the preset area includes:

configured to subtract the preset area according to the operation that is used to shrink, in a portrait orientation, the icon of the folder and obtained by the obtaining unit.

With reference to the fourth aspect of the present invention or the first possible implementation manner of the fourth aspect, in a fourth possible implementation manner of the fourth aspect, that the obtaining unit is configured to obtain the operation that is used to shrink the icon of the folder includes:

configured to obtain a sliding operation of sliding from the preset area to an icon area of the folder except the preset area; and that the extension and shrinking unit is configured to subtract, according to the operation that is used to shrink the icon of the folder and obtained by the obtaining unit, the preset area includes:

configured to shrink the icon area of the folder according to the sliding operation, where a shrunk icon area of the folder is an area obtained by subtracting the preset area from the icon area, before the shrinking, of the folder.

According to a fifth aspect of the present invention, a terminal is provided, including:

an input apparatus, configured to obtain an operation performed on an icon area of a folder;

an output apparatus, configured to display, in the preset area, information about a preset file in the folder; and a processor, separately connected to the input apparatus and the output apparatus and configured to: determine whether the operation obtained by the input apparatus is performed on the preset area in the icon area of the folder; and if the operation is performed on the preset area in the icon area of the folder, open the preset file.

With reference to the fifth aspect of the present invention, in a first possible implementation manner of the fifth aspect, the processor is further configured to: when the operation is performed on an icon area of the folder except the preset area, open the folder.

With reference to the fifth aspect of the present invention or the first possible implementation manner of the fifth aspect, in a second possible implementation manner of the fifth aspect, the input apparatus is configured to obtain the operation performed on the icon area of the folder, where the icon area of the folder includes a plurality of the preset areas that respectively and correspondingly display information about a plurality of the preset files.

With reference to the fifth aspect of the present invention, or the first or the second possible implementation manner of the fifth aspect, in a third possible implementation manner of the fifth aspect, the processor is further configured to: before the input apparatus obtains the operation performed on the icon area of the folder, detect available space around a user interface position on which an icon of the folder is located; and when the detected available space is greater than or equal to a set threshold, extend the icon of the folder toward the available space, where an extended icon area of the folder includes the preset area.

With reference to the third possible implementation manner of the fifth aspect of the present invention, in a fourth possible implementation manner of the fifth aspect, that before the input apparatus obtains the operation performed on the icon area of the folder, the processor detects the available space around the user interface position on which the icon of the folder is located includes:

before the input apparatus obtains the operation performed on the icon area of the folder, detecting, by the processor, available space on two sides of a landscape orientation or a portrait orientation of a user interface position on which the folder is located.

With reference to the third or the fourth possible implementation manner of the fifth aspect of the present invention, in a fifth possible implementation manner of the fifth aspect, that when the detected available space is greater than or equal to the set threshold, the processor extends the icon of the folder toward the available space includes:

when the detected available space is greater than or equal to the set threshold, determining, by the processor, whether the folder includes the preset file, where the information about the preset file is used to be displayed in the preset area; and if it is determined that the folder includes the preset file, extending the icon of the folder toward the available space.

With reference to any one of the third to the fifth possible implementation manners of the fifth aspect of the present invention, in a sixth possible implementation manner of the fifth aspect, the input apparatus is further configured to: before the processor detects the available space around the user interface position on which the icon of the folder is located, obtain an operation that is used to extend the icon of the folder; and that the processor detects the available space around the user interface position on which the icon of the folder is located includes:

when the input apparatus obtains the operation that is used to extend the icon of the folder, detecting, by the processor, the available space around the user interface position on which the icon of the folder is located.

With reference to the sixth possible implementation manner of the fifth aspect of the present invention, in a seventh possible implementation manner of the fifth aspect, the input apparatus is further configured to: before obtaining the operation that is used to extend the icon of the folder, obtain an operation that is used to make the icon of the folder enter a to-be-operated state; and the processor is further configured to make the icon of the folder enter the to-be-operated state according to the operation that is used to make the icon of the folder enter the to-be-operated state and obtained by the input apparatus.

With reference to the sixth or the seventh possible implementation manner of the fifth aspect of the present invention, in an eighth possible implementation manner of the fifth aspect, that the input apparatus obtains a trigger operation that is used to extend the icon of the folder includes:

obtaining, by the input apparatus, an operation that is used to extend, in a landscape orientation, the icon of the folder; and that the processor extends the icon of the folder toward the available space includes:

extending, by the processor, in a landscape orientation, the icon of the folder according to the operation that is used to extend, in a landscape orientation, the icon of the folder and obtained by the input apparatus.

With reference to the sixth or the seventh possible implementation manner of the fifth aspect of the present invention, in a ninth possible implementation manner of the fifth aspect, that the input apparatus obtains a trigger operation that is used to extend the icon of the folder includes:

obtaining, by the input apparatus, an operation that is used to extend, in a portrait orientation, the icon of the folder; and that the processor extends the icon of the folder toward the available space includes:

extending, by the processor, in a portrait orientation, the icon of the folder according to the operation that is used to extend, in a portrait orientation, the icon of the folder and obtained by the input apparatus.

According to a sixth aspect of the present invention, a terminal is provided, including:

an input apparatus, configured to obtain an operation that is used to shrink an icon of a folder;

an output apparatus, configured to display, in a preset area in an icon area of the folder, information about a preset file in the folder; and a processor, configured to subtract, according to the operation that is used to shrink the icon of the folder and obtained by the input apparatus, the preset area to shrink the icon of the folder.

With reference to the sixth aspect of the present invention, in a first possible implementation manner of the sixth aspect, that the input apparatus obtains the operation that is used to shrink the icon of the folder includes:

obtaining, by the input apparatus, an operation performed on the preset area, where the operation performed on the preset area is used to shrink the icon of the folder.

With reference to the sixth aspect of the present invention or the first possible implementation manner of the sixth aspect, in a second possible implementation manner of the sixth aspect, that the input apparatus obtains the operation that is used to shrink the icon of the folder includes:

obtaining, by the input apparatus, an operation that is used to shrink, in a landscape orientation, the icon of the folder; and that the processor subtracts, according to the operation that is used to shrink the icon of the folder and obtained by the input apparatus, the preset area includes:

subtracting, by the processor, the preset area according to the operation that is used to shrink, in a landscape orientation, the icon of the folder and obtained by the input apparatus.

With reference to the sixth aspect of the present invention or the first possible implementation manner of the sixth aspect, in a third possible implementation manner of the sixth aspect, that the input apparatus obtains the operation that is used to shrink the icon of the folder includes:

obtaining, by the input apparatus, an operation that is used to shrink, in a portrait orientation, the icon of the folder; and that the processor subtracts, according to the operation that is used to shrink the icon of the folder and obtained by the input apparatus, the preset area includes:

subtracting, by the processor, the preset area according to the operation that is used to shrink, in a portrait orientation, the icon of the folder and obtained by the input apparatus.

With reference to the sixth aspect of the present invention or the first possible implementation manner of the sixth aspect, in a fourth possible implementation manner of the sixth aspect, that the input apparatus obtains the operation that is used to shrink the icon of the folder includes:

obtaining, by the input apparatus, a sliding operation of sliding from the preset area to an icon area of the folder except the preset area; and that the processor subtracts, according to the operation that is used to shrink the icon of the folder and obtained by the input apparatus, the preset area includes:

shrinking, by the processor, the icon area of the folder according to the sliding operation obtained by the input apparatus, where a shrunk icon area of the folder is an area obtained by subtracting the preset area from the icon area, before the shrinking, of the folder.

In the embodiments of the present invention, an icon of a file in a folder is displayed on an icon of the folder. When the folder is not opened, a user may directly view, from the icon of the folder, an icon of a file that needs to be opened, so as to directly implement a trigger operation of opening the file, which is simple and convenient.

DESCRIPTION OF EMBODIMENTS

Embodiments are listed in the following to describe the present invention in detail.

Figure 1:
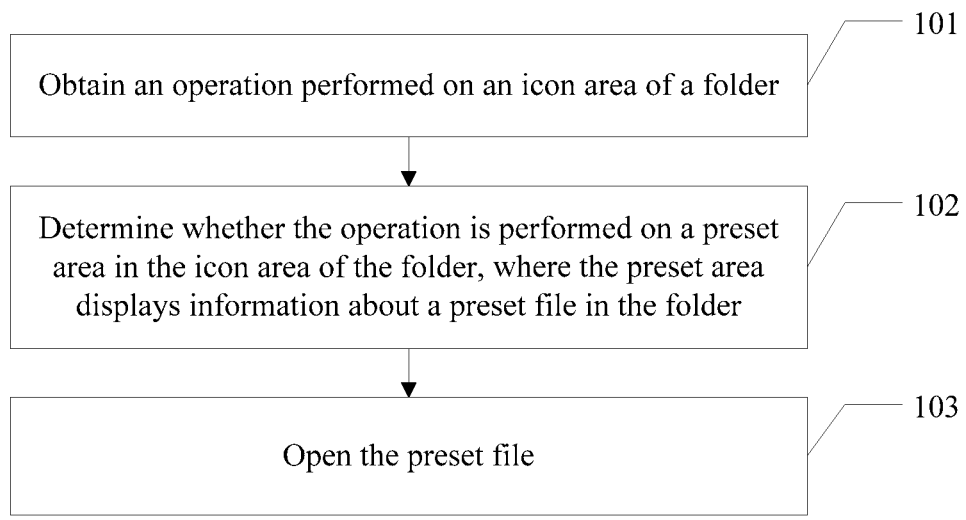
FIG. 1 is a schematic flowchart of a method for opening a file in a folder according to an embodiment of the present invention.

As shown in FIG. 1, an embodiment of the present invention provides a method for opening a file in a folder, where the method includes the following steps:

101. Obtain an operation performed on an icon area of a folder.

The operation may be clicking on a mouse, may be tapping a touchscreen by a user, or may be a non-contact operation or an air gesture operation, where an area on which the operation is performed is the icon area of the folder.

102. Determine whether the operation is performed on a preset area in the icon area of the folder, where the preset area displays information about a preset file in the folder.

The information about the preset file may be an icon of the preset file. The preset file may be all or some files in the folder. For example, when there are a relatively small quantity of files in the folder, for example, there is only one or two files in the folder, all files in the folder may be displayed on an icon of the folder. Alternatively, when there are a relatively large quantity of files in the folder, some files in the folder may be displayed on an icon of the folder. In this step, a terminal device may automatically select, according to a preset condition, an icon of a file that is in the folder and meets the preset condition, and display the icon of the file on the icon of the folder. For example, the preset file may be a most frequently used file in the folder or a recently used file. In addition, the preset file may be manually set by the user, that is, a file, selected by the user, in the folder is used as the preset file. For example, the user may select a favorite file from files in the folder, and perform a manual setting, to display an icon of the favorite file on the icon of the folder. Certainly, the user may select a file according to a requirement, and display an icon of the selected file on the icon of the folder. The file herein includes an application.

If a result of the determining in step 102 is that the operation is performed on the preset area in the icon area of the folder, step 103 is performed.

103. Open the preset file.

When the folder is not opened, the user may view the icon of the preset file in the folder from the icon of the folder, and if a file that needs to be opened is the preset file, may directly implement a trigger operation of opening the file. For example, when the user views that an icon of an application needing to be opened is displayed on the icon of the folder, the user may click the displayed icon of the application to directly open the application.

In an actual application, the file may be opened by clicking the folder according to a habit of the user. To avoid affecting use of the folder, the following technical solution may be used in this embodiment of the present invention: If the obtained operation is performed on an icon area of the folder except the preset area, the folder is opened. The icon area of the folder except the preset area may be used to display a thumbnail icon of a file in the folder. For example, the icon of the folder may be divided into two areas: One area is used to display the icon of the preset file in the folder, where the file may directly be opened by an operation performed on this area; the other area may be used to display a thumbnail icon of a file in the folder, where the folder may be opened by an operation performed on the other area. To help identify the two different areas and help the user identify the icon of the preset file, the icon that is of the preset file and displayed in the icon area of the folder should be greater than the displayed thumbnail icon.

Specifically, a terminal displays icons of some files in the folder on the icon of the folder, where the some files include a first file. That is, an icon of the first file is displayed on the icon of the folder. The terminal device obtains a trigger operation that is used to open the first file and occurs in a first area, where the first area is an area for displaying the icon of the first file on the icon of the folder; and after obtaining the trigger operation that is used to open the first file, opens the first file. Therefore, the user may directly open the first file only by directly clicking the icon that is of the first file and displayed on the icon of the folder. The other area described above may be used to display or not display the thumbnail of the file in the folder, and an example of displaying the thumbnail of the file is used herein for description. Specifically, thumbnails of other files in the folder are displayed on the icon of the folder; a trigger operation that is used to open the folder and occurs in a second area is obtained, where the second area is an area for displaying the thumbnails of the other files on the icon of the folder, that is, a thumbnail display area; and after the trigger operation that is used to open the folder is obtained, the folder is opened.

To allow the icon of the folder to have a sufficient area to clearly display the icon of the file, the icon that is of the folder and in a normal state needs to be extended to increase a size of the icon of the folder. Therefore, this embodiment of the present invention may further include a technical solution of extending the icon of the folder. Specifically, before the operation performed on the icon area of the folder is obtained, the terminal may obtain an operation that is used to extend the icon of the folder; detect available space around a user interface position on which the icon of the folder is located according to the operation that is used to extend the icon of the folder. The terminal may automatically detect the available space around the user interface position on which the icon of the folder is located; and when the detected available space is greater than or equal to a set threshold, the icon of the folder is extended toward the available space. An extended icon area of the folder includes the preset area. The threshold may be preset smallest extendable space. After the icon of the folder is extended toward the available space, the information about the preset file is displayed in the preset area. The detecting available space around a user interface position on which the icon of the folder is located according to the operation that is used to extend the icon of the folder may specifically include: detecting available space on two sides of a landscape orientation or a portrait orientation of a user interface position on which the folder is located. It needs to be noted herein that a plurality of the preset areas may be set in the icon area of the folder, where the plurality of the preset areas may respectively and correspondingly display information about a plurality of the preset files. A plurality of preset areas may be set according to a requirement, especially when it is detected that there is sufficient available space that can be used to extend the icon area of the folder and is around the icon of the folder.

The following further describes the present invention with reference to a specific application scenario.

Figure 2A:
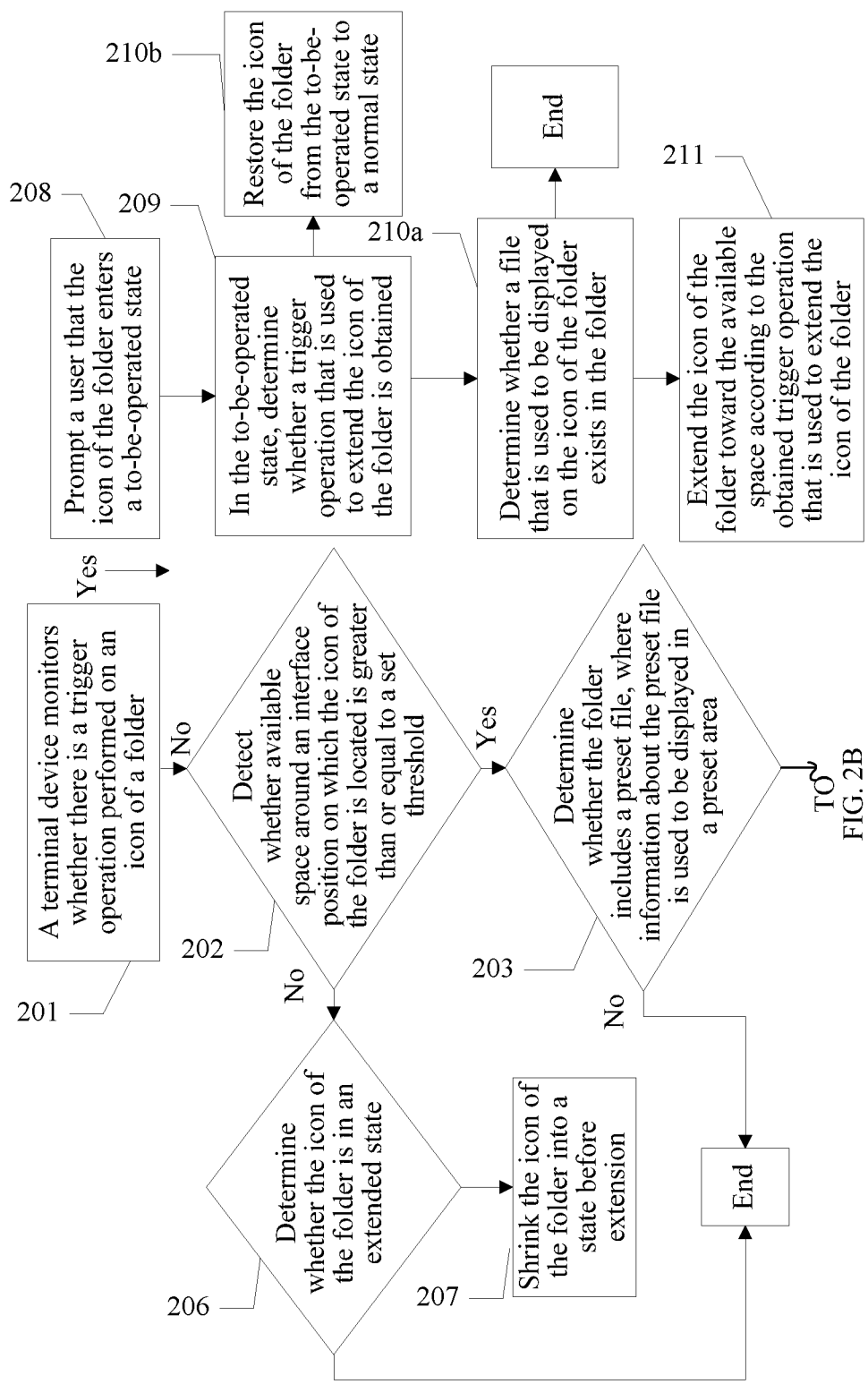
FIG. 2A and FIG. 2B are a schematic flowchart of another method for opening a file in a folder according to an embodiment of the present invention.
Figure 2B:
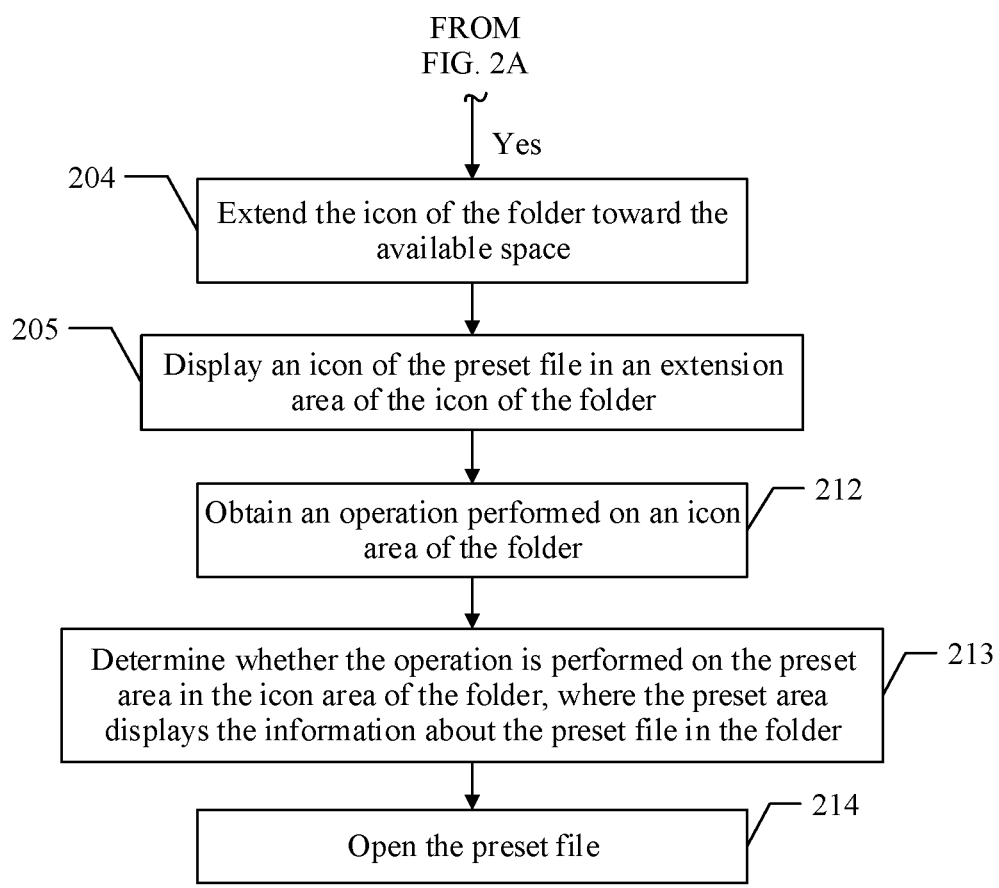

As shown in FIG. 2, FIG. 2 shows a flowchart of a method for opening a file in a folder, where a procedure of the method includes:

201. A terminal device monitors whether there is a trigger operation performed on an icon of a folder.

The trigger operation may be a set touch and hold operation or another gesture operation. For example, a user drags, on a user interface of a terminal, the icon of the folder. If there is no trigger operation performed on the icon of the folder, step 202 is performed; if there is a trigger operation performed on the icon of the folder, step 208 is performed.

202. Detect whether available space around a user interface position on which the icon of the folder is located is greater than or equal to a set threshold.

That is, whether there is sufficient available space that is used to extend the icon of the folder and around the position of the icon of the folder is detected. When the detected available space is greater than or equal to the threshold, step 203 is performed; or when the detected available space is less than the threshold, step 206 is performed.

203. Determine whether the folder includes a preset file, where information about the preset file is used to be displayed in the preset area.

If it is determined that the folder includes the preset file, step 204 is performed; or if it is determined that the folder does not include the preset file, the procedure ends. For the preset file in this step, refer to description about the preset file in step 102 in Embodiment 1, and details are not described herein again.

204. Extend the icon of the folder toward the available space.

The terminal device may extend the icon of the folder according to a size of the detected available space, or may extend the icon of the folder according to a size of preset extension space.

205. Display an icon of the preset file in an extension area of the icon of the folder. That is, an extension area of an extended icon of the folder is used as the preset area to display the icon of the preset file.

206. Determine whether the icon of the folder is in an extended state.

When it is determined that the icon of the folder is in the extended state, step 207 is performed. When it is determined that the icon of the folder is not in the extended state, the procedure ends.

207. Shrink the icon of the folder to a state before extension.

That is, the icon of the folder is restored to a normal state, that is, to a size that is the same as a normal folder on the user interface.

The foregoing steps 202 to 204 are a procedure in which the terminal device automatically detects the available space and extends the icon of the folder. The following steps 208 to 211 are a procedure in which a user manually extends the icon of the folder.

Step 208: Prompt a user that the icon of the folder enters a to-be-operated state.

The to-be-operated state is a state in which the icon of the folder is ready for an extending or shrinking operation. When the icon of the folder enters the to-be-operated state, an extending or shrinking operation may be performed on the icon of the folder. When the extending operation is performed on the icon of the folder, the icon of the folder is extended. When the shrinking operation is performed on the icon of the folder, the icon of the folder is diminished, and may be diminished to a size of the icon that is of the folder and in the normal state.

209. In the to-be-operated state, determine whether a trigger operation that is used to extend the icon of the folder is obtained.

For example, when the icon of the folder is in the to-be-operated state, the terminal device obtains the trigger operation that is used to extend the icon of the folder, and when the trigger operation that is used to extend the icon of the folder is obtained, performs step 210a. For example, an operation that is used to extend, in a landscape orientation, the icon of the folder is obtained; and the icon of the folder is extended in a landscape orientation according to the obtained operation that is used to extend, in a landscape orientation, the icon of the folder. Alternatively, an operation that is used to extend, in a portrait orientation, the icon of the folder is obtained; and the icon of the folder is extended in a portrait orientation according to the obtained operation that is used to extend, in a portrait orientation, the icon of the folder. That is, the user may directly and manually extend, on the user interface of the terminal device, the icon of the folder to extend the icon of the folder. Certainly, if the trigger operation that is used to extend the icon of the folder is not obtained, step 210*b* is performed.

210*a*. Determine whether the folder includes the preset file.

If the folder includes the preset file, step 211 is performed; or if the folder does not include the preset file, step 210*b* is performed. For the preset file in this step 210*a*, refer to the description about the preset file in step 102 in Embodiment 1, and details are not described herein again.

210*b*. Restore the icon of the folder from the to-be-operated state to a normal state.

211. Extend the icon of the folder toward the available space according to the obtained trigger operation that is used to extend the icon of the folder. Step 205 is performed after step 211.

Therefore, according to the method in the present invention, a terminal may automatically identify available space on a user interface, and extends an icon of a folder; or an icon of a folder may be directly and manually extended when the folder is in a to-be-operated state, so that an icon of a file in the folder is clearly displayed on an extended icon of the folder.

After step 205 is performed, the method further includes:

212. Obtain an operation performed on an icon area of the folder.

213. Determine whether the operation is performed on the preset area in the icon area of the folder, where the preset area displays the information about the preset file in the folder.

If the operation is performed on the preset area in the icon area of the folder, step 214 is performed.

If the operation is not performed on the preset area in the icon area of the folder, the procedure ends.

214. Open the preset file.

Steps 212 to 214 are similar to steps 101 to 103 in Embodiment 1, and details are not described herein again.

The following describes the present invention with reference to a specific application diagram.

Figure 3:
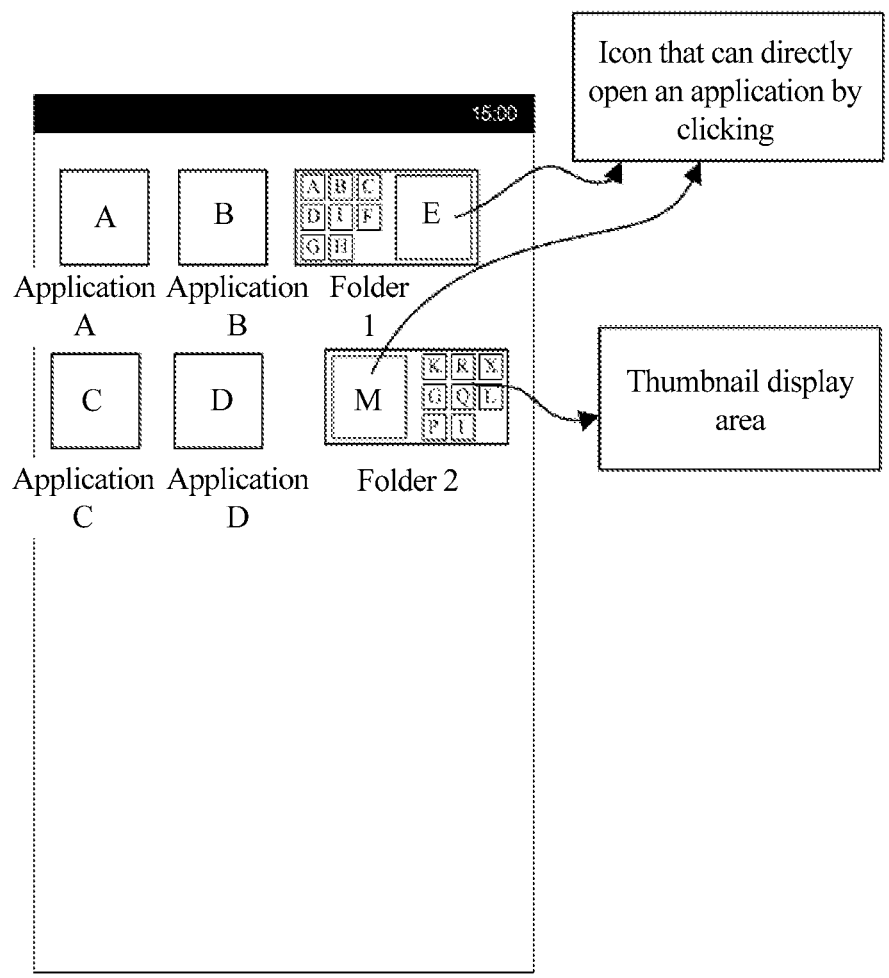
FIG. 3 is a schematic diagram of a user interface.

As shown in FIG. 3, an icon of an application A, an icon of an application B, an icon of an application C, an icon of an application D, an icon of a folder 1, and an icon of a folder 2 are displayed on a user interface of a terminal. The icon of the folder 1 is divided into two parts of areas. One area is a thumbnail display area, where the thumbnail display area displays a thumbnail of the application A, a thumbnail of the application B, a thumbnail of the application C, a thumbnail of the application D, a thumbnail of an application I, a thumbnail of an application F, a thumbnail of an application G, and a thumbnail of an application H. The other area displays an icon of an application E. In FIG. 3, a size of the icon of the application E displayed in an icon area of the folder 1 is greater than those of the thumbnails of the applications A, B, C, D, I, F, G, and H to be distinguished from the thumbnails of these applications, so that a user views the icon of the application E from the icon of the folder 1. The icon of the application E displayed in the icon area of the folder 1 may also be a thumbnail, where a size of the thumbnail is greater than those of the thumbnails of the applications A, B, C, D, I, F, G, and H, which can also be distinguished from the thumbnails of these applications and achieve an objective of facilitating viewing by the user.

Figure 4A:
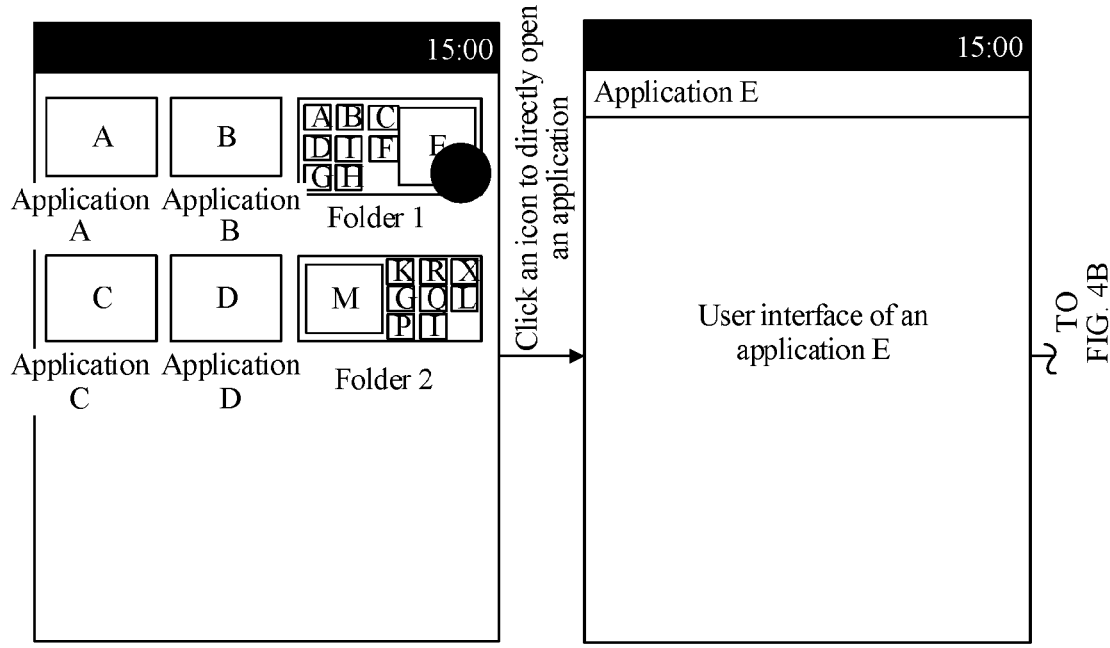
FIG. 4A and FIG. 4B are a schematic diagram of an operation.
Figure 4B:
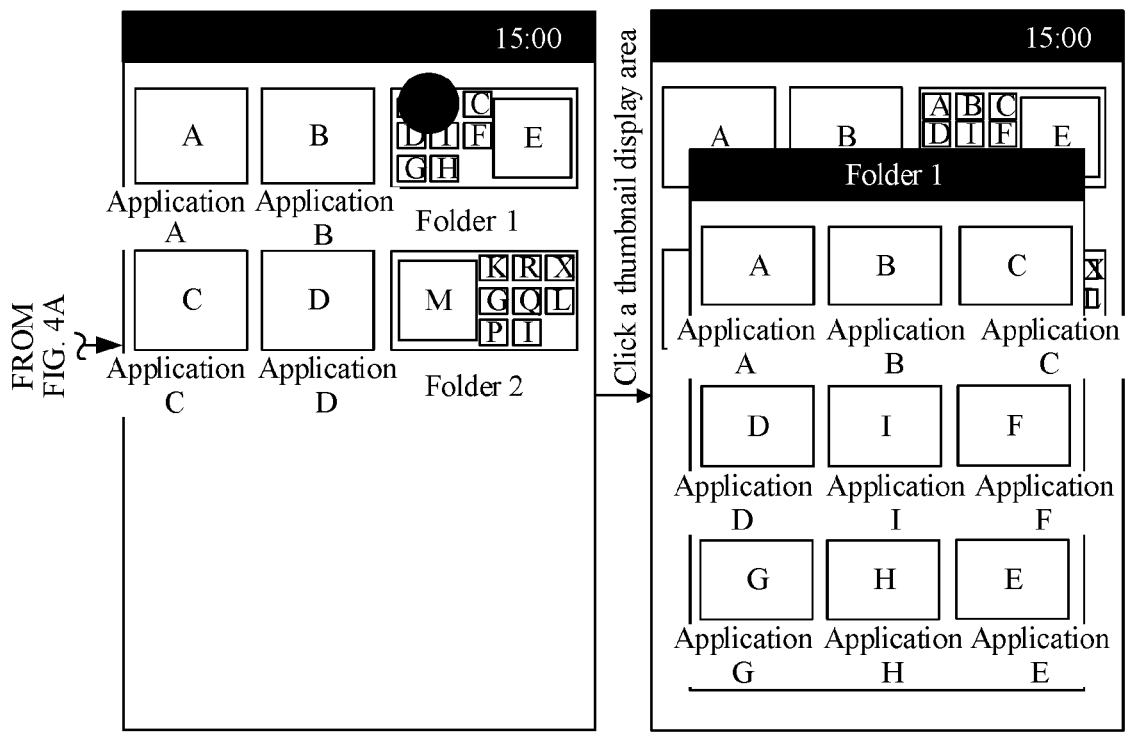

As shown in FIG. 4, the user can open the folder 1 by directly clicking the thumbnail display area. The user can directly open the application E by directly clicking the icon of the application E. Folder 2 also includes two parts of areas. One area is also a thumbnail display area, where the thumbnail display area displays a thumbnail of an application K, a thumbnail of an application R, a thumbnail of an application X, a thumbnail of an application G, a thumbnail of an application Q, a thumbnail of an application L, a thumbnail of an application P, and a thumbnail of an application I. The other area displays an icon of an application M. The user may open the folder 2 by directly clicking the thumbnail display area. The user can directly open the application M by directly clicking the icon of the application M. It should be noted herein that in FIG. 4, a size of the icon of the application M displayed in an icon area of the folder 2 is greater than those of the thumbnails of the applications K, R, X, G, Q, L, P, and I to be distinguished from the thumbnails of these applications, so that the user views the icon of the application E from the icon of the folder 1. The icon of the application M displayed in the icon area of the folder 2 may also be a thumbnail, where a size of the thumbnail is greater than those of the thumbnails of the applications K, R, X, G, Q, L, P, and I, which can also be distinguished from the thumbnails of these applications and facilitate viewing by the user.

Figure 5:
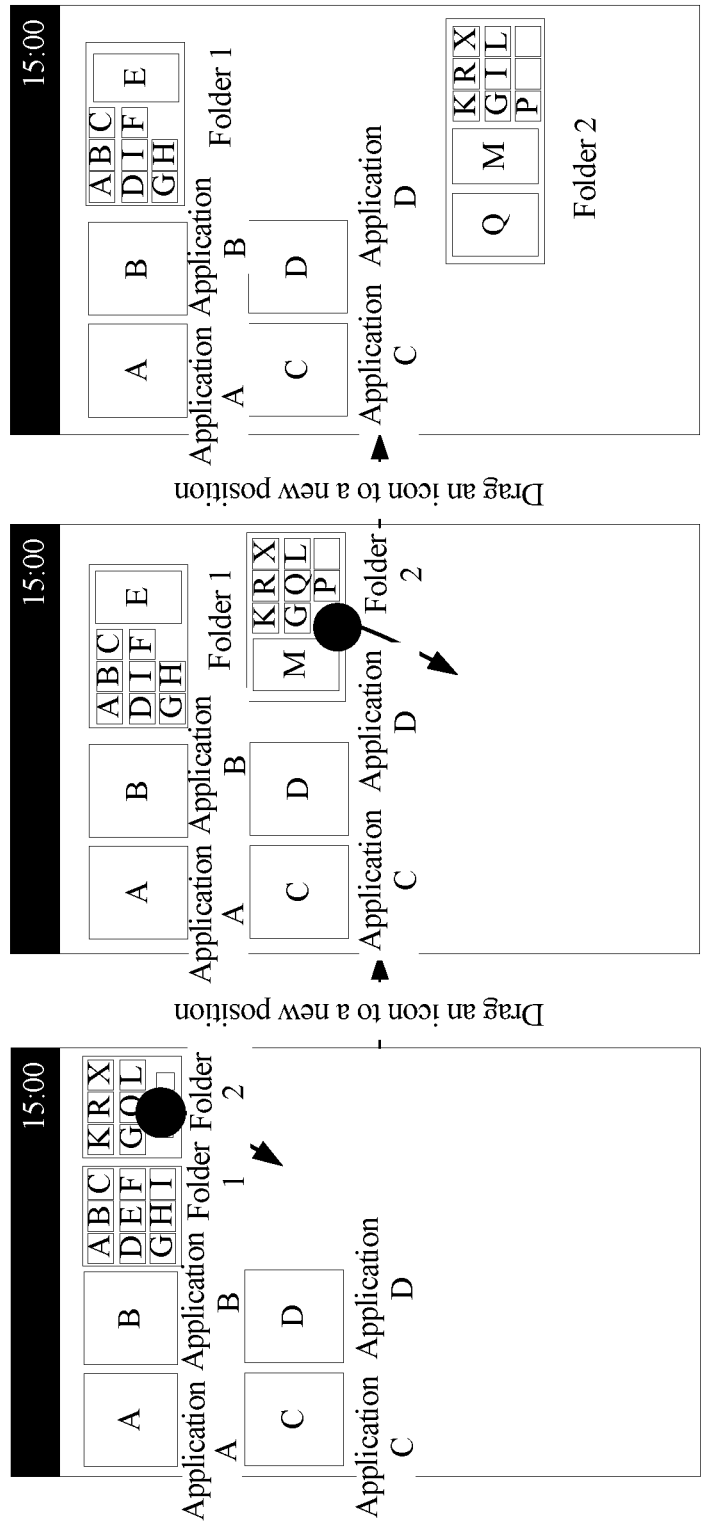
FIG. 5 is a schematic diagram of an operation.
Figure 6A:
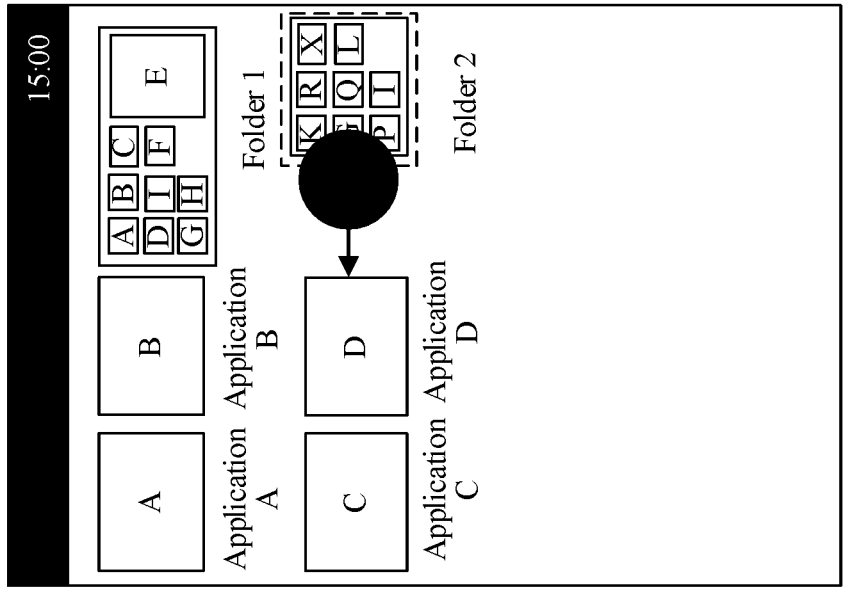
FIG. 6A and FIG. 6B are a schematic diagram of an operation.
Figure 6A:
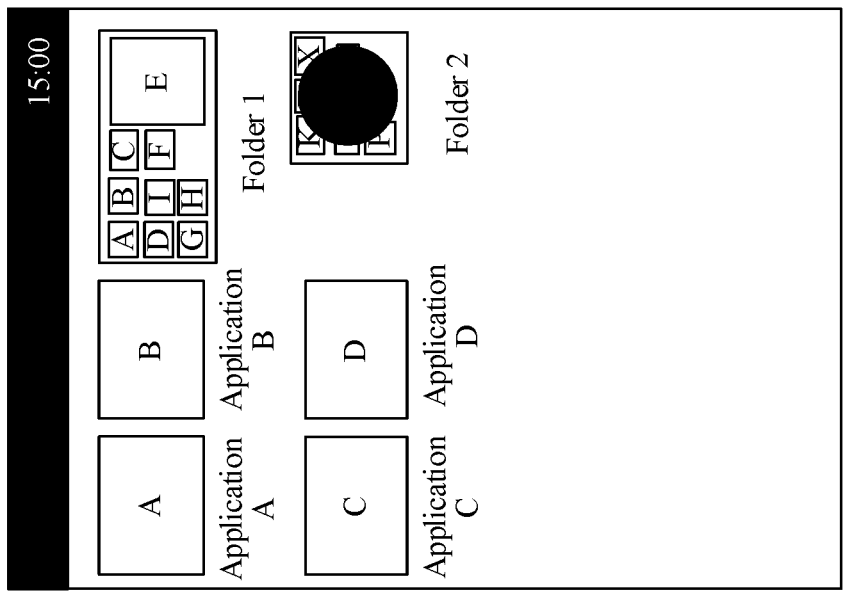
Figure 6B:
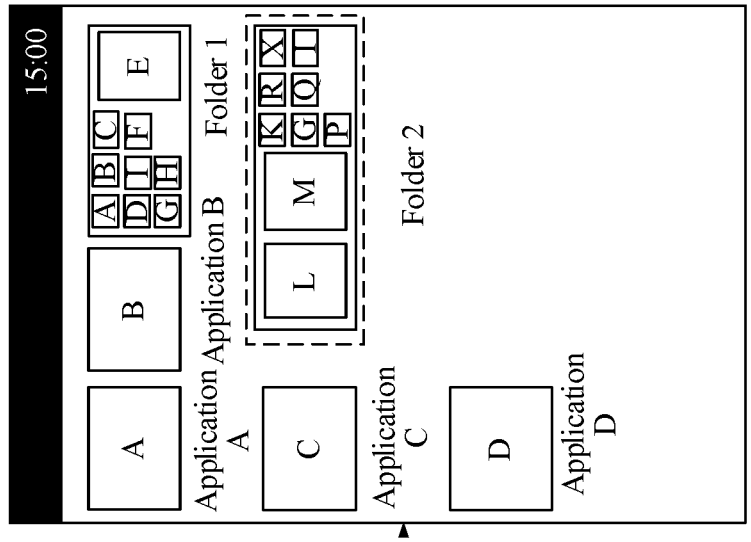
Figure 6B:
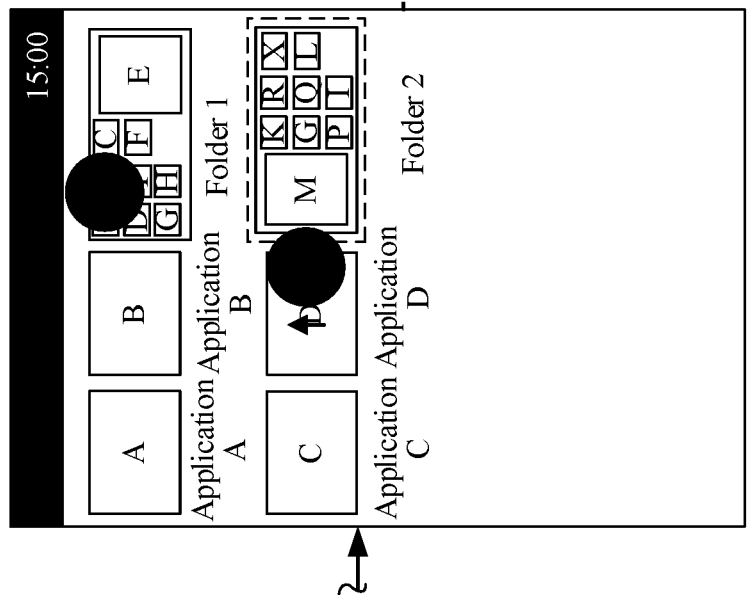

As shown in FIG. 5, FIG. 5 shows a diagram of automatically extending, in a landscape orientation, an icon of a folder, which imposes no limitation on the present invention. In a landscape orientation, there is no available space on left and right sides of an icon of a folder 1 and an icon of a folder 2. In a process of using the method of the present invention, a user may drag the icon of the folder 2 and the icon of the folder 2 downward to a position around which there is available space, so that the icon of the folder 2 is extended. Because the icon of the folder 2 is dragged, available space is also generated on the right side of the icon of the folder 1, so that the icon of the folder 1 is also extended. It can be seen from FIG. 5 that an icon of an application E is displayed on an extended icon of the folder 1, and an icon of an application M is displayed on an extended icon of the folder 2. The icon of the folder 2 may be dragged again to a position around which there is more available space, so as to extend the icon of the folder 2 again, so that an icon of an application Q is also displayed on the icon of the folder 2. Certainly, before the icon of the folder 2 is dragged, icons of applications that need to be displayed on the icon of the folder 2 may be prioritized. In a case in which there is sufficient space on the extended icon of the folder 2, the icons of the applications are displayed on the icon of the folder 2 according to priorities. Herein, a priority of the icon of the application M is higher than that of the icon of the application Q.

As shown in FIG. 6, FIG. 6 shows a diagram of manually extending, in a landscape orientation, an icon of a folder. An icon of a folder 2 on a user interface is dragged in a landscape orientation toward available space. When an extension space of the icon of the folder can accommodate an icon of one application, an application M with a highest priority is displayed in the extension space. The icon of the folder 2 continues to be dragged further in a landscape orientation. A terminal moves an application D on the user interface to another position on the user interface, and the icon of the folder 2 is further extended, where space increased by the further extending can accommodate one more icon of an application; then, an icon of an application L is displayed in the space increased by the further extending, where a priority of the icon of the application L is lower than that of the icon of the application M.

As shown in FIG. 7, FIG. 7 shows a process of manually setting an icon of an application to be displayed on an icon of a folder. A thumbnail area of an icon of a folder 1 is clicked, so as to open the folder 1. An icon of an application I in the folder 1 is dragged to a position of a folder title of the folder 1; then, the icon of the application I is displayed on the icon of the folder 1. Likewise, an icon of an application E in the folder 1 is dragged to the position of the folder title of the folder 1; then, the icon of the application E is displayed on the icon of the folder 1.

Figure 7A:
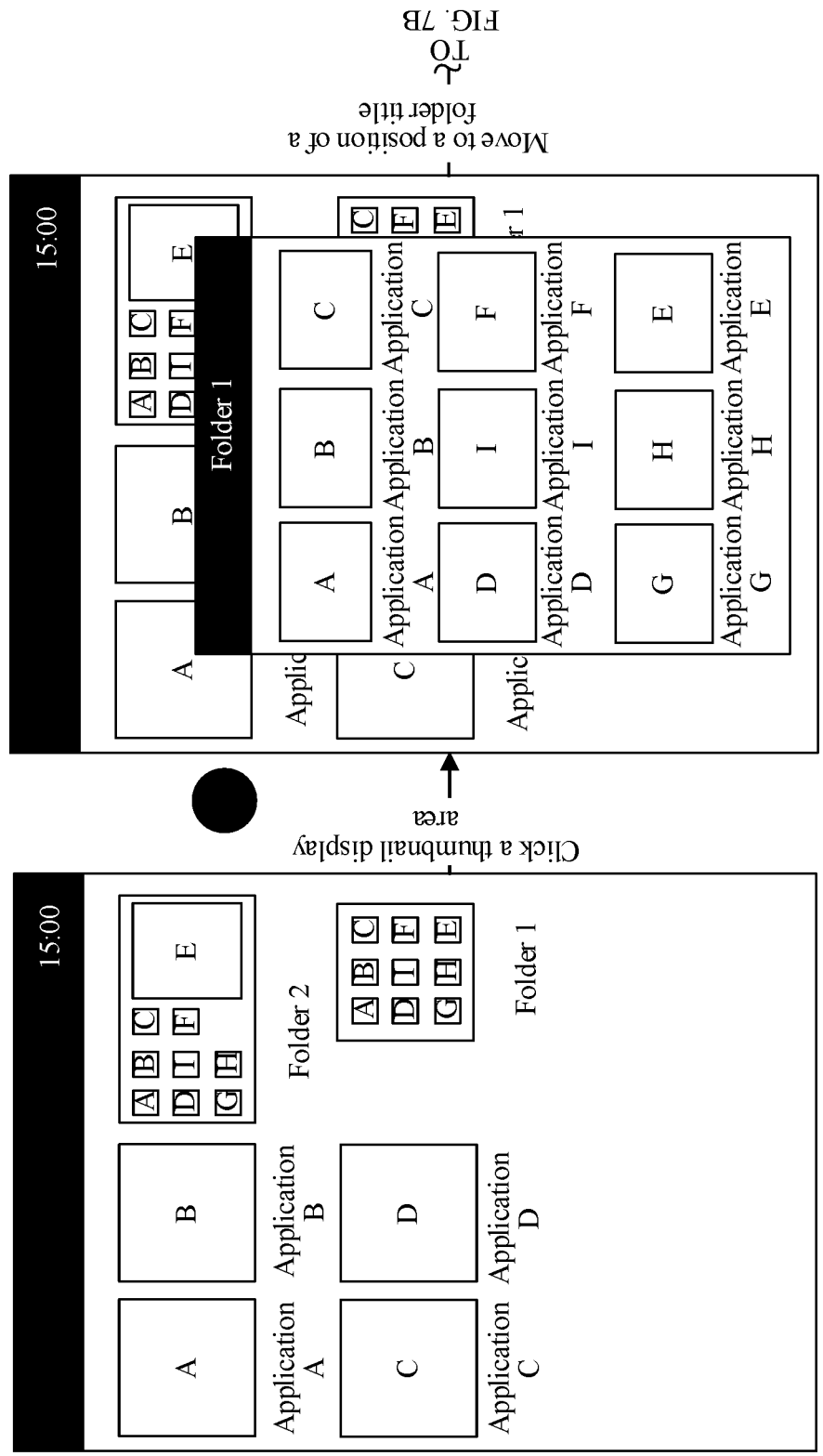
FIG. 7A, FIG. 7B, FIG. 7C, and FIG. 7D are a schematic diagram of an operation.
Figure 7B:
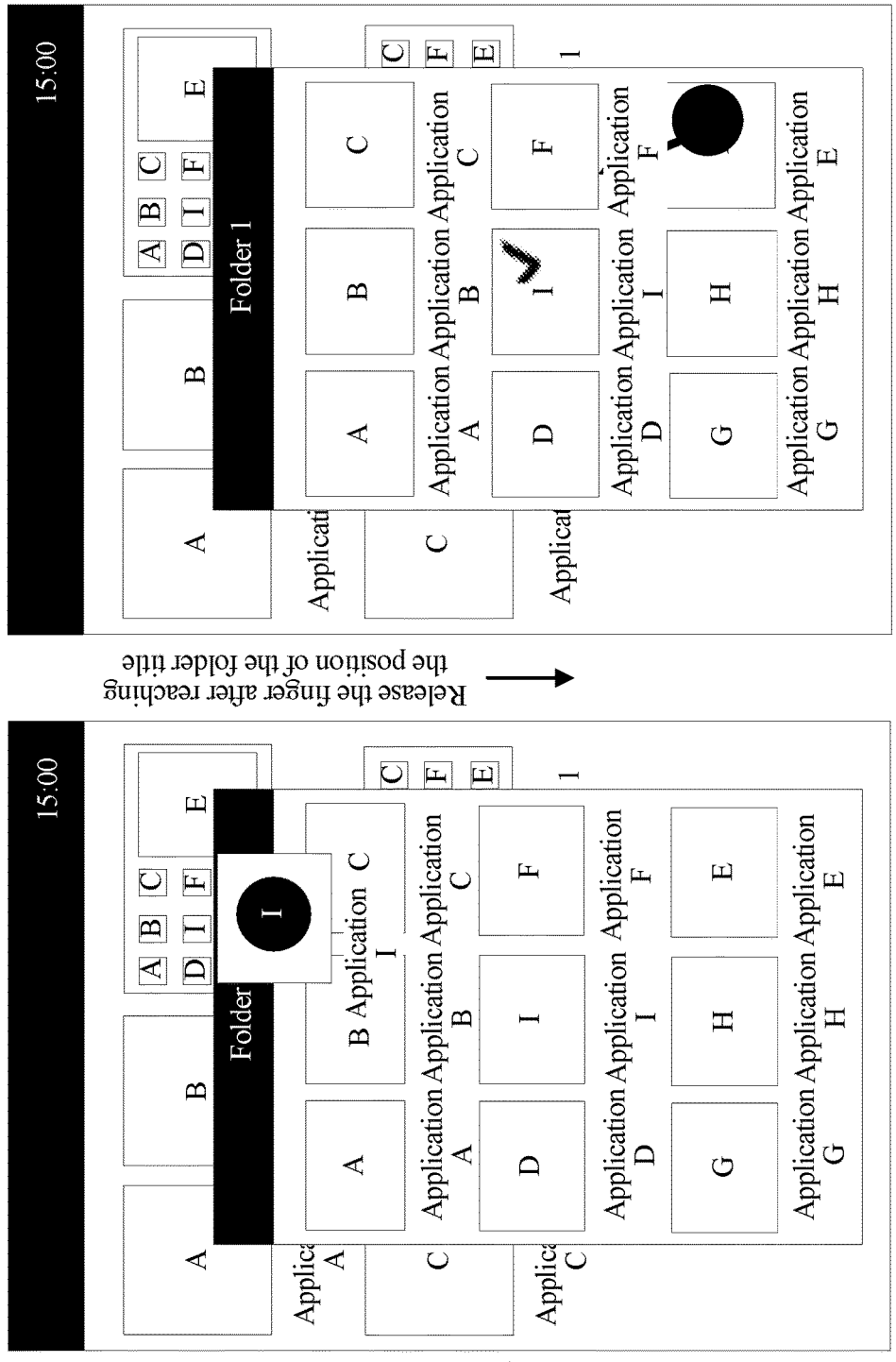
Figure 7C:
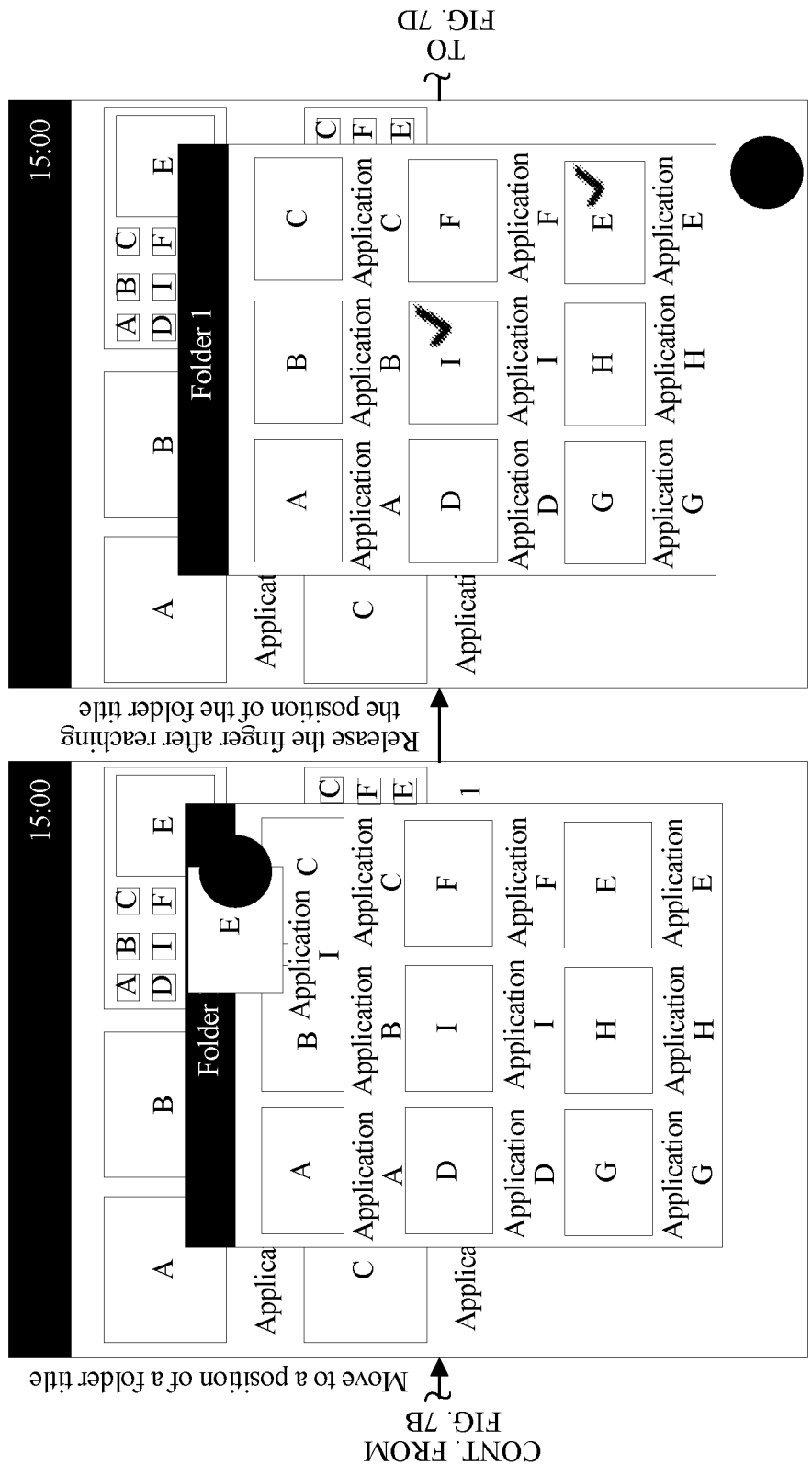
Figures 7D, 8:
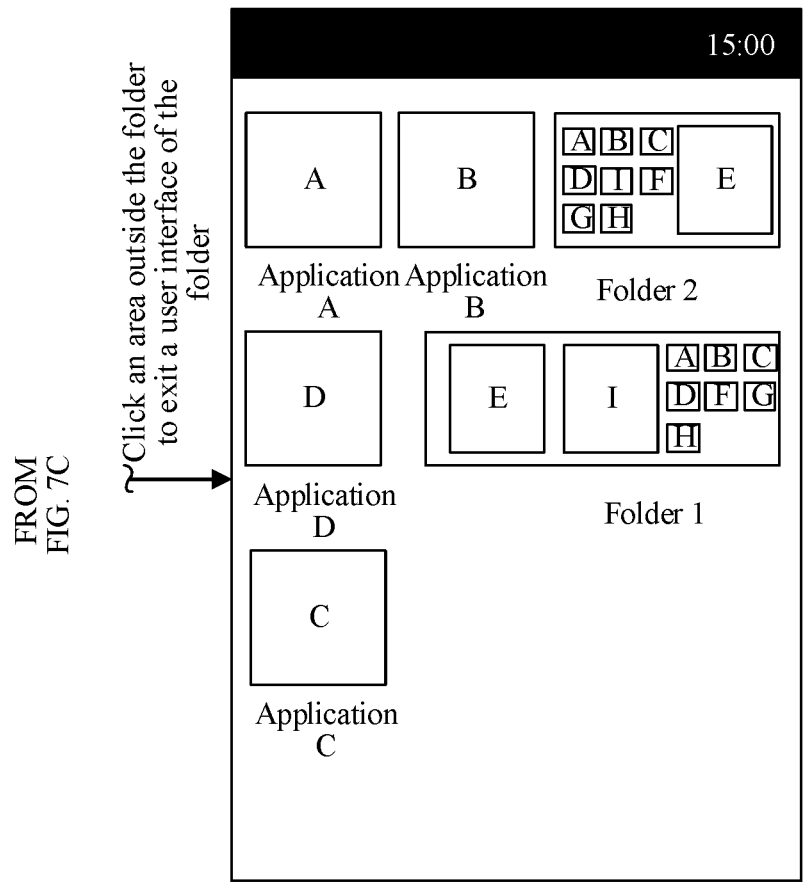
FIG. 8 is a schematic flowchart of a method for processing an icon of a folder according to an embodiment of the present invention.

As shown in FIG. 8, an embodiment of the present invention further provides a method for processing an icon of a folder, including the following steps: 301. Obtain an operation that is used to shrink an icon of a folder, where a preset area in an icon area of the folder displays information about a preset file in the folder.

302. Subtract, according to the obtained operation that is used to shrink the icon of the folder, the preset area to shrink the icon of the folder.

Step 301 may include:

obtaining an operation performed on the preset area, where the operation performed on the preset area is used to shrink the icon of the folder.

This embodiment of the present invention may also use the following technical solutions so that a user can use different gestures to perform a shrinking operation on the icon of the folder.

For example, a terminal obtains an operation that is used to shrink, in a landscape orientation, the icon of the folder and subtracts the preset area according to the obtained operation that is used to shrink, in a landscape orientation, the icon of the folder, and diminish the icon of the folder, where the preset area is an area that is on the icon of the folder and displays, in a landscape orientation, an icon of the preset file.

For another example, a terminal obtains an operation that is used to shrink, in a portrait orientation, the icon of the folder and subtracts the preset area according to the obtained operation that is used to shrink, in a portrait orientation, the icon of the folder, where the preset area is an area that is on the icon of the folder and displays, in a portrait orientation, the icon of the file.

For still another example, a sliding operation of sliding from the preset area to an icon area of the folder except the preset area is obtained; and the icon area of the folder is reduced according to the sliding operation, where a reduced icon area of the folder is an area obtained by subtracting the preset area from the icon area, before being reduced, of the folder. Specifically, an operation of sliding from a first area to a second area is obtained, where the first area is an area that is on the icon of the folder and displays the icon of the preset file in the folder, that is, a preset area, and the second area is an area that is on the icon of the folder and used to display a thumbnail of a file in the folder; the preset area on the icon of the folder is subtracted according to the operation of sliding from the first area to the second area.

Figure 9A:
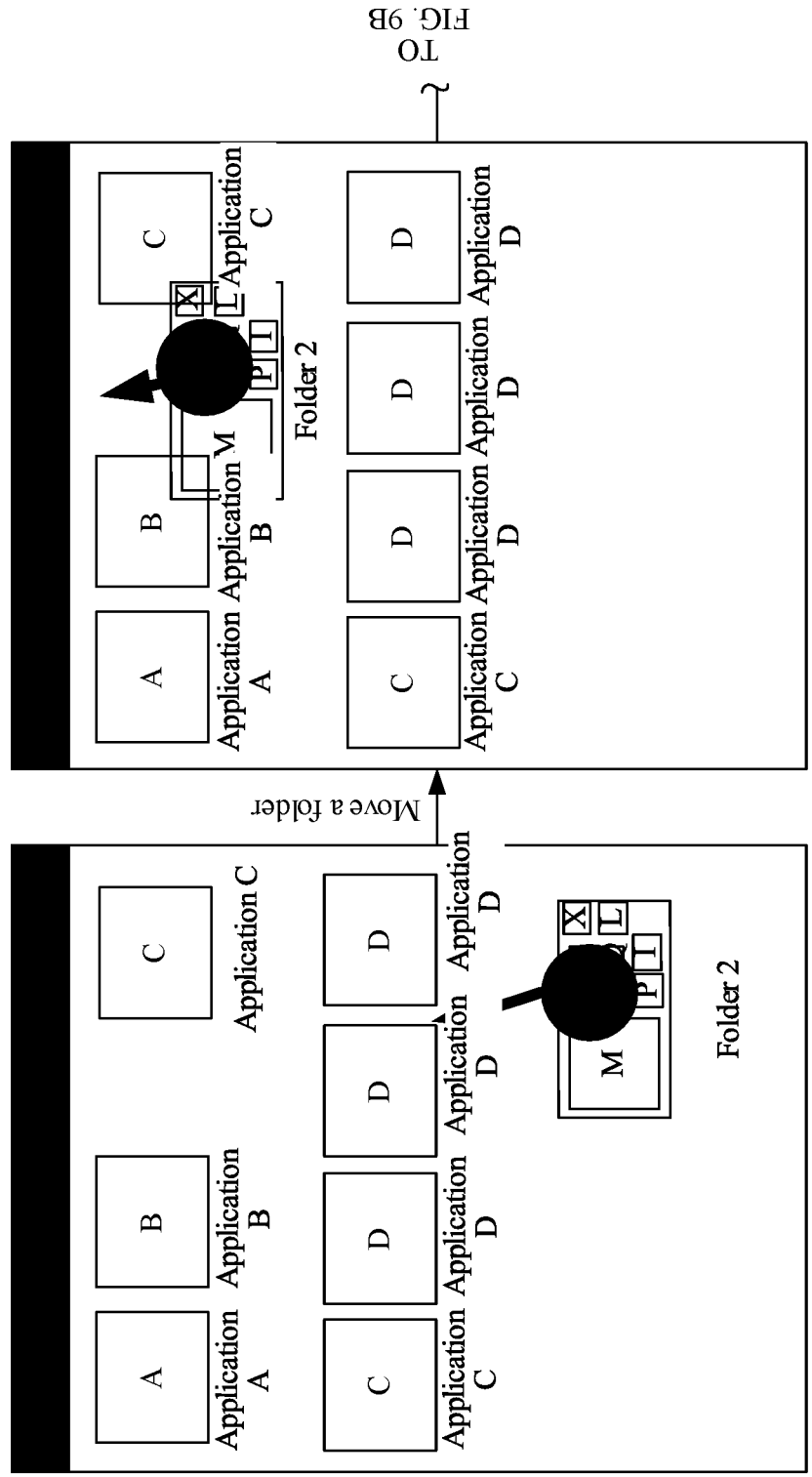
FIG. 9A and FIG. 9B are a schematic diagram of an operation.
Figure 9B:
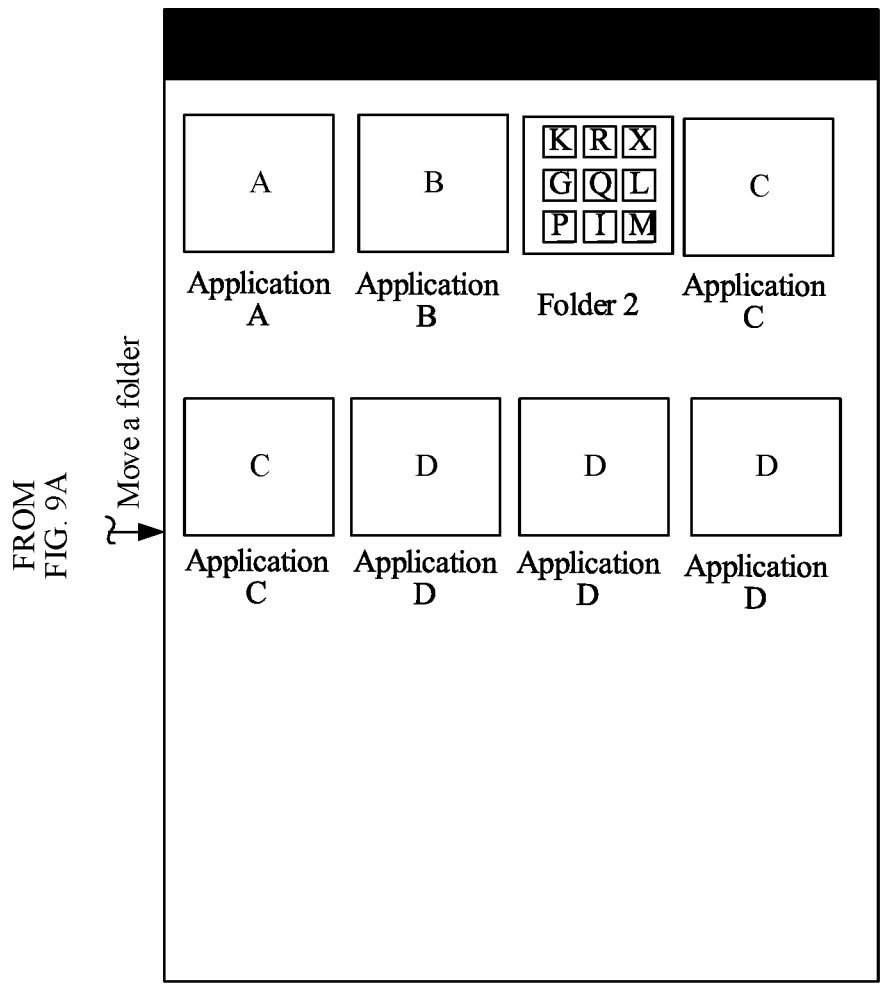

When the operation that is used to shrink the icon of the folder and is obtained in step 301 is a dragging operation, whether available space around a target position of the dragging is less than a preset threshold is detected, and when the available space is less than the preset threshold, the icon of the folder is shrunk. As shown in FIG. 9, an extended icon of a folder 2 is dragged to available space between an application B and an application C. Because the available space can accommodate only an icon, before being extended, of the folder 2, when a terminal detects that the available space cannot accommodate the extended icon of the folder 2, the icon of the folder 2 is shrunk to a size of the icon, before being extended, of the folder 2.

Figure 10A:
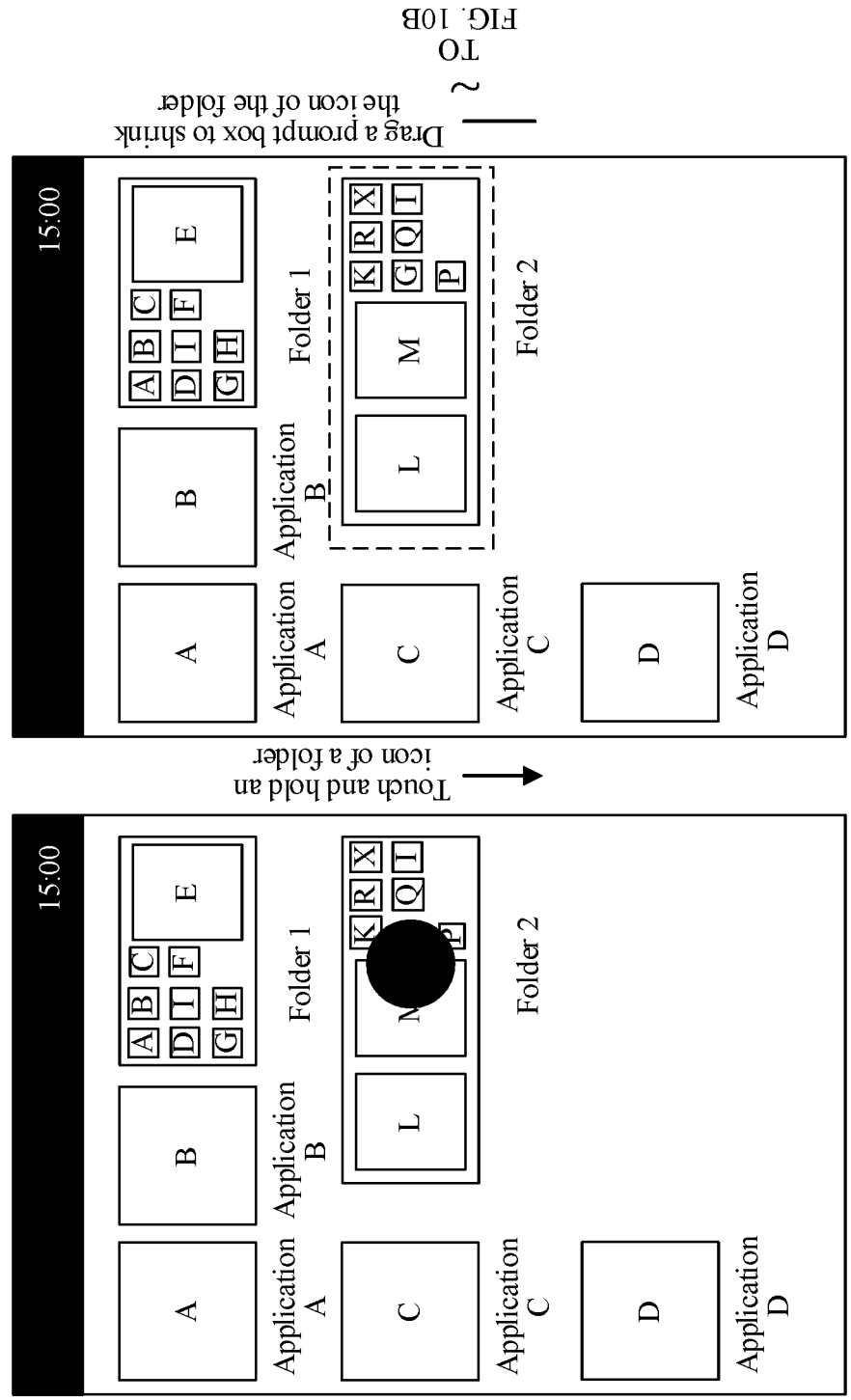
FIG. 10A and FIG. 10B are a schematic diagram of an operation.
Figure 10B:
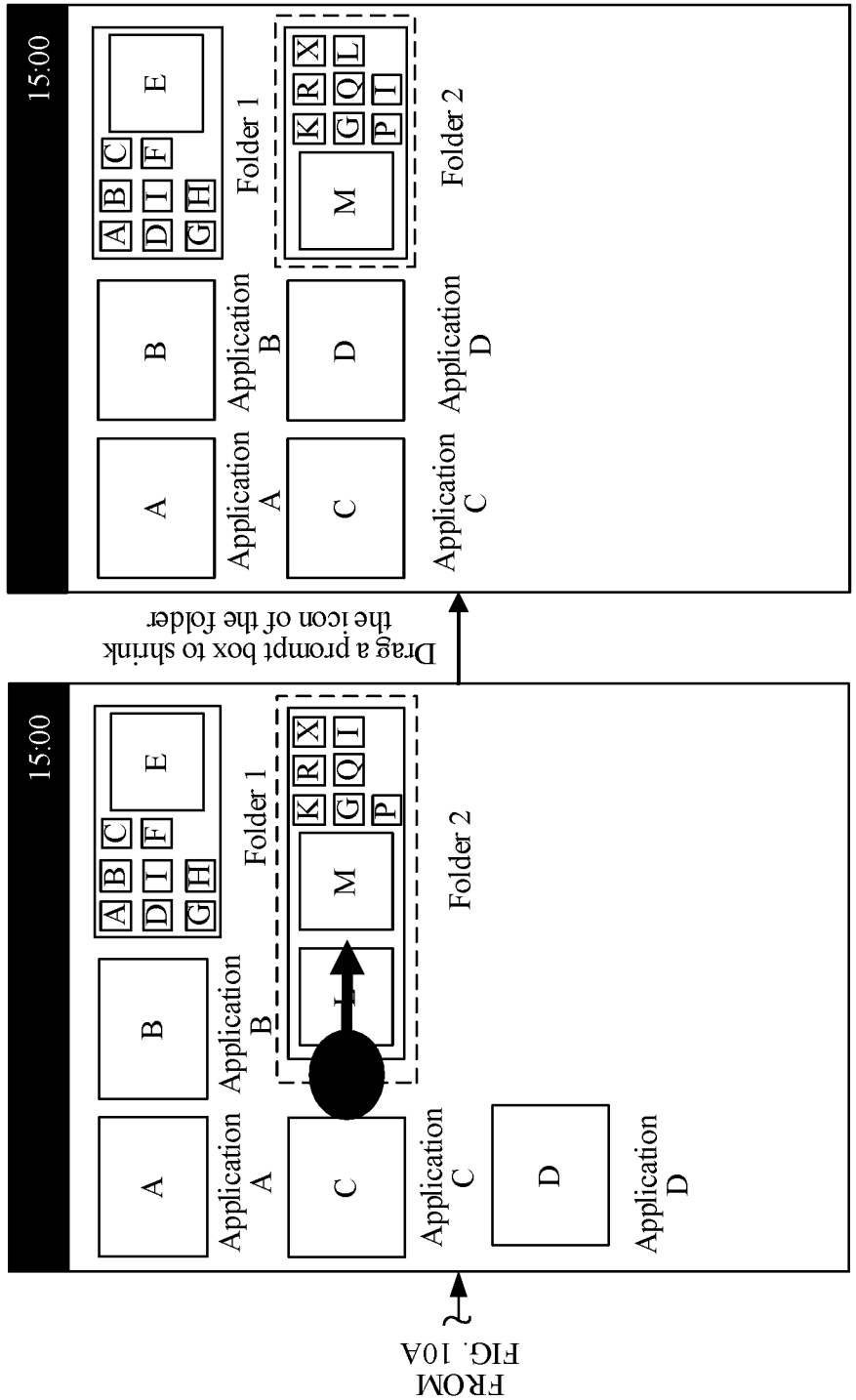
Figure 11A:
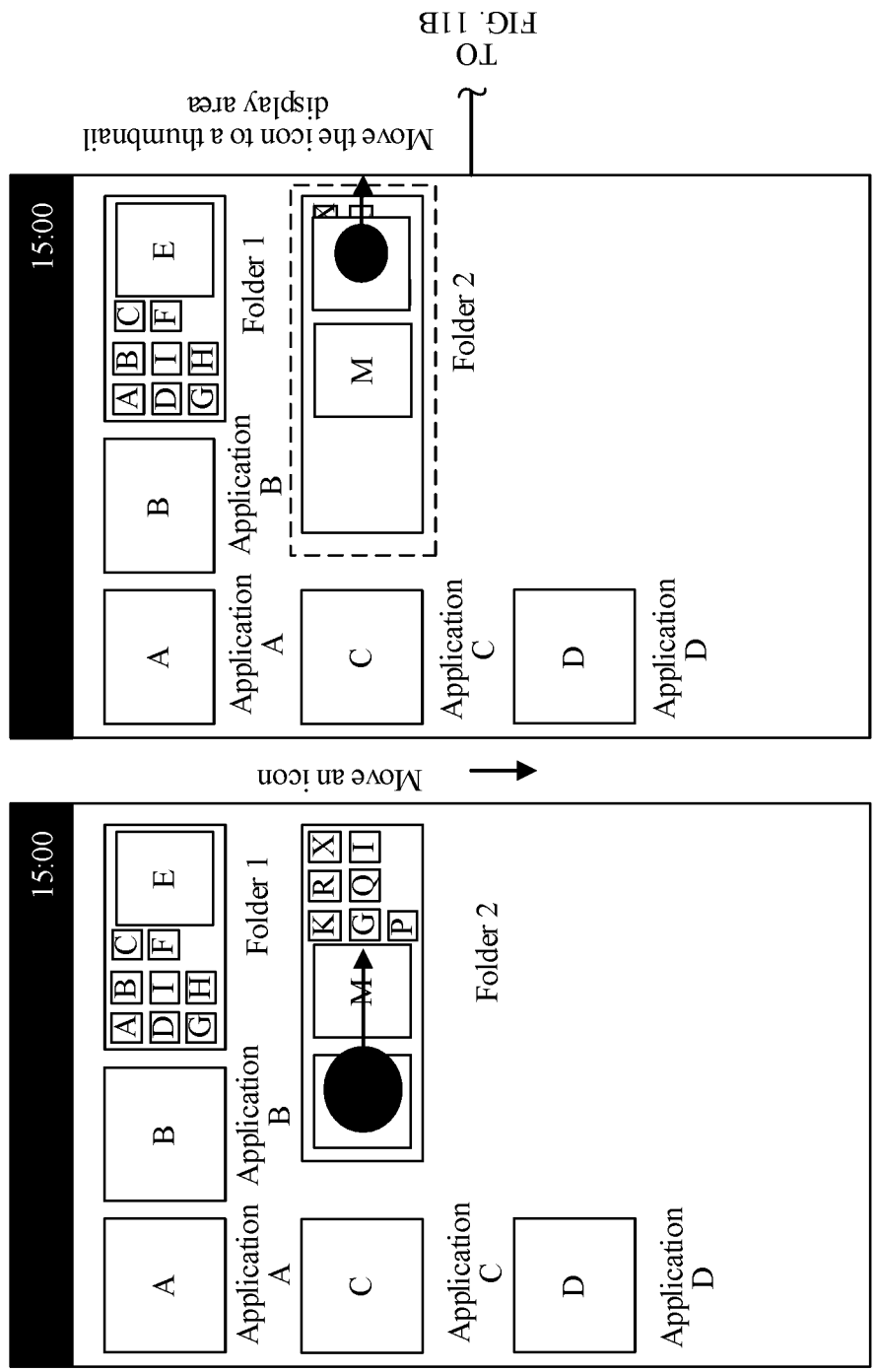
FIG. 11A and FIG. 11B are a schematic diagram of an operation.
Figure 11B:
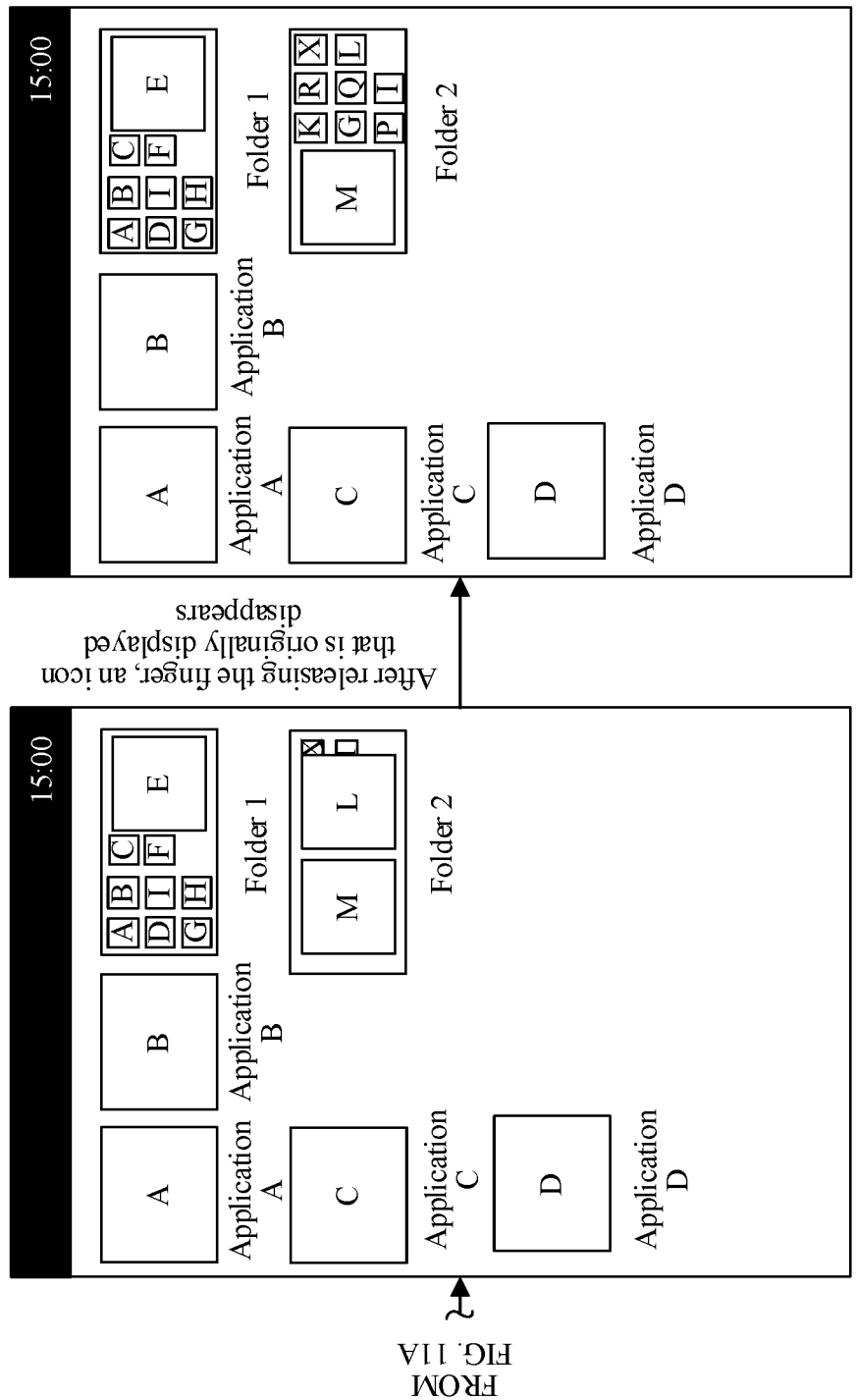

As shown in FIG. 10, a user may restore an extended icon of a folder by using a manual operation. For example, an icon of an application L and an icon of an application M are displayed on an icon of a folder 2. A manner of touching and holding the icon of the folder 2 is used, so that the icon of the folder 2 is in a to-be-operated state, and then a dragging operation is used to drag from a position of the icon of the application L to a thumbnail display area of the icon of the folder 2, so that the icon of the application L disappears from the icon of the folder 2, and the icon of the folder 2 is diminished. Likewise, the icon of the application M may also be dragged to the thumbnail display area of the icon of the folder 2, so that the icon of the application M also disappears, so as to further shrink the icon of the folder 2. As shown in FIG. 11, the icon of the application L is directly dragged to the thumbnail display area of the icon of the folder without setting the to-be-operated state of the icon of the folder, so that the icon of the application L disappears from the icon of the folder 2, and the icon of the folder is diminished.

Figure 12:
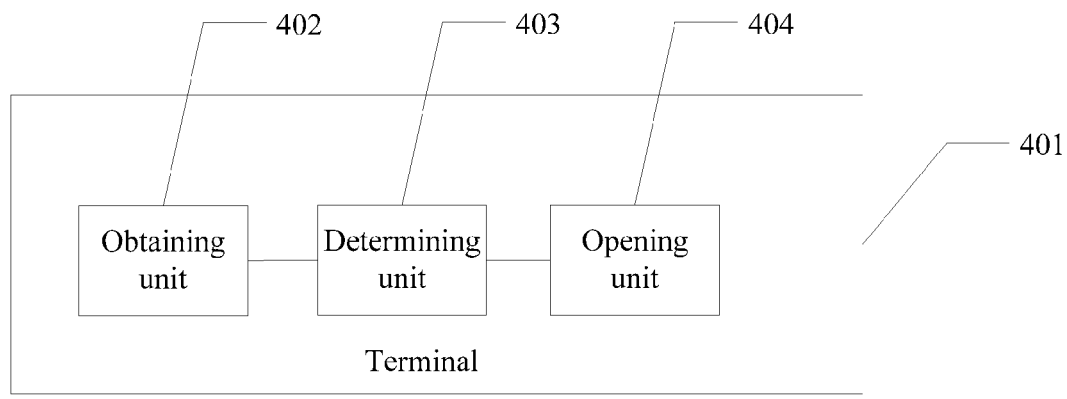
FIG. 12 is a schematic structural diagram of a terminal.

As shown in FIG. 12, an embodiment of the present invention provides a terminal 401, including:

an obtaining unit 402, configured to obtain an operation performed on an icon area of a folder;

a determining unit 403, configured to determine whether the operation obtained by the obtaining unit 402 is performed on a preset area in the icon area of the folder, where the preset area displays information about a preset file in the folder; and an opening unit 404, configured to: if the determining unit 403 determines that the operation is performed on the preset area in the icon area of the folder, open the preset file.

Figure 13:
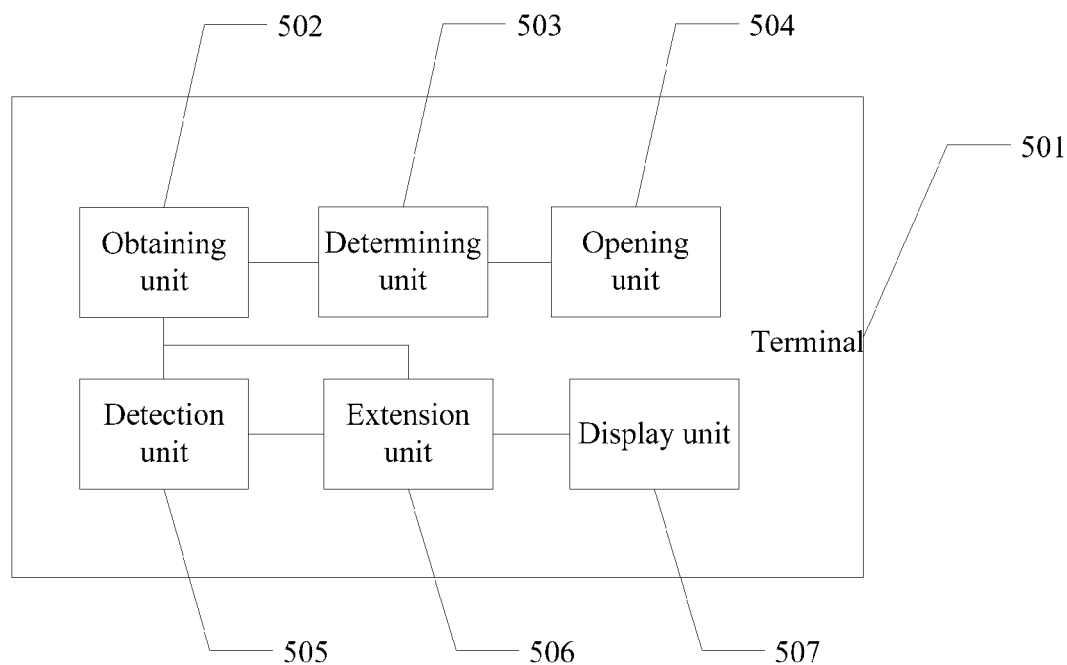
FIG. 13 is a schematic structural diagram of another terminal.

As shown in FIG. 13, an embodiment of the present invention further provides a terminal 501, including:

an obtaining unit 502, configured to obtain an operation performed on an icon area of a folder;

a determining unit 503, configured to determine whether the operation obtained by the obtaining unit 502 is performed on a preset area in the icon area of the folder, where the preset area displays information about a preset file in the folder; and an opening unit 504, configured to: if the determining unit 503 determines that the operation is performed on the preset area in the icon area of the folder, open the preset file.

The opening unit 504 is further configured to: if the determining unit 503 determines that the operation is performed on an icon area of the folder except the preset area, open the folder.

Preferably, the obtaining unit 502 is configured to obtain the operation performed on the icon area of the folder, where the icon area of the folder includes a plurality of the preset areas that respectively and correspondingly display information about a plurality of the preset files.

Preferably, the terminal 501 further includes: a detection unit 505, a extension unit 506, and a display unit 507.

The detection unit 505 is configured to: before the obtaining unit 502 obtains the operation performed on the icon area of the folder, detect available space around a user interface position on which an icon of the folder is located.

The extension unit 506 is configured to: when the available space detected by the detection unit 505 is greater than or equal to a set threshold, extend the icon of the folder toward the available space, where an extended icon area of the folder includes the preset area.

The display unit 507 is configured to: after the extension unit 506 extends the icon of the folder toward the available space, display, in the preset area, the information about the preset file.

Preferably, the detection unit 505 is further configured to: before the obtaining unit 502 obtains the operation performed on the icon area of the folder, detect available space on two sides of a landscape orientation or a portrait orientation of a user interface position on which the folder is located.

Preferably, the extension unit 506 is further configured to: when the available space detected by the detection unit 505 is greater than or equal to the set threshold, determine whether the folder includes the preset file, where the information about the preset file is used to be displayed in the preset area; and if it is determined that the folder includes the preset file, extend the icon of the folder toward the available space.

Preferably, the obtaining unit 502 is further configured to: before the detection unit 505 detects the available space around the user interface position on which the icon of the folder is located, obtain an operation that is used to extend the icon of the folder.

That the detection unit 505 is configured to detect the available space around the user interface position on which the icon of the folder is located includes:

configured to: detect, according to the operation that is used to extend the icon of the folder and obtained by the obtaining unit 502, the available space around the user interface position on which the icon of the folder is located.

Preferably, the obtaining unit 503 is further configured to: before obtaining the operation that is used to extend the icon of the folder, obtain an operation that is used to make the icon of the folder enter a to-be-operated state, so that the icon of the folder enters the to-be-operated state.

Preferably, that the obtaining unit 502 is configured to obtain the operation that is used to extend the icon of the folder includes:

configured to obtain an operation that is used to extend, in a landscape orientation, the icon of the folder.

That the extension unit 506 is configured to extend the icon of the folder toward the available space includes:

configured to extend, in a landscape orientation, the icon of the folder according to the operation that is used to extend, in a landscape orientation, the icon of the folder and obtained by the obtaining unit 502.

Preferably, that the obtaining unit 502 is configured to obtain the operation that is used to extend the icon of the folder includes:

configured to obtain an operation that is used to extend, in a portrait orientation, the icon of the folder.

That the extension unit 506 is configured to extend the icon of the folder toward the available space includes:

configured to extend, in a portrait orientation, the icon of the folder according to the operation that is used to extend, in a portrait orientation, the icon of the folder and obtained by the obtaining unit 502.

Figure 14:
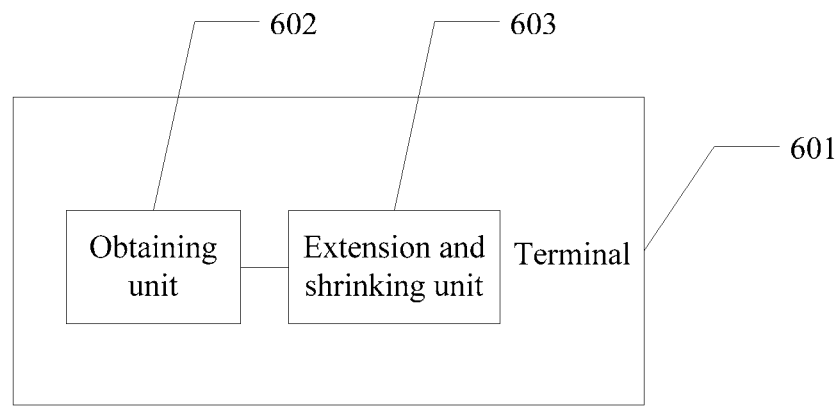
FIG. 14 is a schematic structural diagram of still another terminal.

As shown in FIG. 14, an embodiment of the present invention further provides a terminal 601, including:

an obtaining unit 602, configured to obtain an operation that is used to shrink an icon of a folder, where a preset area in an icon area of the folder displays information about a preset file in the folder; and a extension and shrinking unit 603, configured to subtract, according to the operation that is used to shrink the icon of the folder and obtained by the obtaining unit 602, the preset area to shrink the icon of the folder.

Preferably, that the obtaining unit 602 is configured to obtain the operation that is used to shrink the icon of the folder includes:

configured to obtain an operation performed on the preset area, where the operation performed on the preset area is used to shrink the icon of the folder.

Preferably, that the obtaining unit 602 is configured to obtain the operation that is used to shrink the icon of the folder includes:

configured to obtain an operation that is used to shrink, in a landscape orientation, the icon of the folder.

That the extension and shrinking unit 603 is configured to subtract, according to the operation that is used to shrink the icon of the folder and obtained by the obtaining unit, the preset area includes:

configured to subtract the preset area according to the operation that is used to shrink, in a landscape orientation, the icon of the folder and obtained by the obtaining unit 602.

Preferably, that the obtaining unit 602 is configured to obtain the operation that is used to shrink the icon of the folder includes:

configured to obtain an operation that is used to shrink, in a portrait orientation, the icon of the folder.

That the extension and shrinking unit 603 is configured to subtract, according to the operation that is used to shrink the icon of the folder and obtained by the obtaining unit, the preset area includes:

configured to subtract the preset area according to the operation that is used to shrink, in a portrait orientation, the icon of the folder and obtained by the obtaining unit 602.

Preferably, that the obtaining unit 602 is configured to obtain the operation that is used to shrink the icon of the folder includes:

configured to obtain a sliding operation of sliding from the preset area to an icon area of the folder except the preset area.

Figure 15:
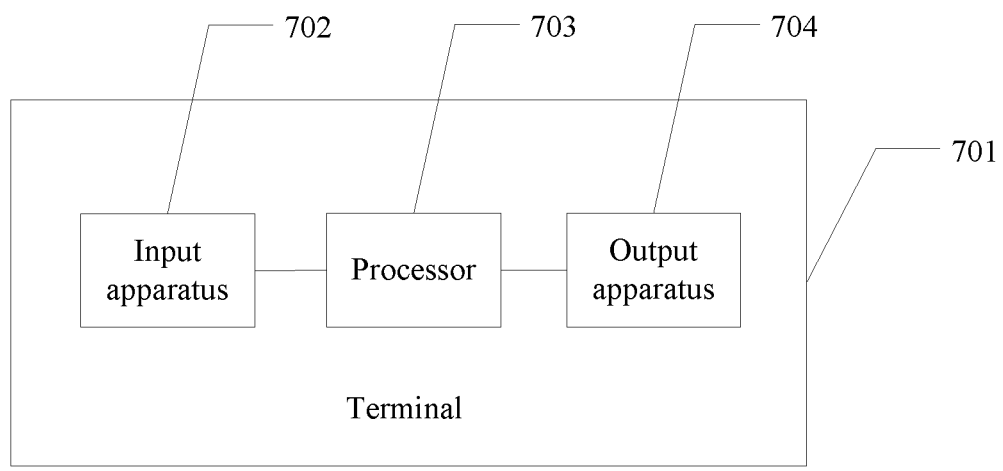
FIG. 15 is a schematic structural diagram of yet another terminal.

That the extension and shrinking unit 603 is configured to subtract, according to the operation that is used to shrink the icon of the folder and obtained by the obtaining unit, the preset area includes:

configured to shrink the icon area of the folder according to the sliding operation, where a shrunk icon area of the folder is an area obtained by subtracting the preset area from the icon area, before the shrinking, of the folder. As shown in FIG. 15, an embodiment of the present invention further provides a terminal 701, including:

an input apparatus 702, configured to obtain an operation performed on an icon area of a folder;

an output apparatus 703, configured to display, in the preset area, information about a preset file in the folder; and a processor 704, separately connected to the input apparatus 702 and the output apparatus 703 and configured to: determine whether the operation obtained by the input apparatus 702 is performed on the preset area in the icon area of the folder; and if the operation is performed on the preset area in the icon area of the folder, open the preset file.

Preferably, the processor 704 is further configured to: when the operation is performed on an icon area of the folder except the preset area, open the folder.

Preferably, the input apparatus 702 is configured to obtain the operation performed on the icon area of the folder, where the icon area of the folder includes a plurality of the preset areas that respectively and correspondingly display information about a plurality of the preset files.

Preferably, the processor 704 is further configured to: before the input apparatus 702 obtains the operation performed on the icon area of the folder, detect available space around a user interface position on which the icon of the folder is located; and when the detected available space is greater than or equal to a set threshold, extend the icon of the folder toward the available space, where an extended icon area of the folder includes the preset area.

Preferably, that before the input apparatus 702 obtains the operation performed on the icon area of the folder, the processor 704 detects the available space around the user interface position on which the icon of the folder is located includes:

before the input apparatus 702 obtains the operation performed on the icon area of the folder, detecting, by the processor 704, available space on two sides of a landscape orientation or a portrait orientation of a user interface position on which the folder is located.

Preferably, that when the detected available space is greater than or equal to the set threshold, the processor 704 extends the icon of the folder toward the available space includes:

when the detected available space is greater than or equal to the set threshold, determining, by the processor 704, whether the folder includes the preset file, where the information about the preset file is used to be displayed in the preset area; and if it is determined that the folder includes the preset file, extending the icon of the folder toward the available space.

Preferably, the input apparatus 702 is further configured to: before the processor 704 detects the available space around the user interface position on which the icon of the folder is located, obtain an operation that is used to extend the icon of the folder.

That the processor 704 detects the available space around the user interface position on which the icon of the folder is located includes:

when the input apparatus 702 obtains the operation that is used to extend the icon of the folder, detecting, by the processor 704, the available space around the user interface position on which the icon of the folder is located.

Preferably, the input apparatus 702 is further configured to: before obtaining the operation that is used to extend the icon of the folder, obtain an operation that is used to make the icon of the folder enter a to-be-operated state.

The processor 704 is further configured to make the icon of the folder enter the to-be-operated state according to the operation that is used to make the icon of the folder enter the to-be-operated state and obtained by the input apparatus 702.

Preferably, that input apparatus 702 obtains a trigger operation that is used to extend the icon of the folder includes:

obtaining, by the input apparatus 702, an operation that is used to extend, in a landscape orientation, the icon of the folder.

That the processor 704 extends the icon of the folder toward the available space includes:

extending, by the processor 704, in a landscape orientation, the icon of the folder according to the operation that is used to extend, in a landscape orientation, the icon of the folder and obtained by the input apparatus 702.

Preferably, that input apparatus 702 obtains the trigger operation that is used to extend the icon of the folder includes:

obtaining, by the input apparatus 702, an operation that is used to extend, in a portrait orientation, the icon of the folder.

That the processor 704 extends the icon of the folder toward the available space includes:

extending, by the processor 704, in a portrait orientation, the icon of the folder according to the operation that is used to extend, in a portrait orientation, the icon of the folder and obtained by the input apparatus 702.

An embodiment of the present invention further provides a terminal, including:

an input apparatus, configured to obtain an operation that is used to shrink an icon of a folder;

an output apparatus, configured to display, in a preset area in an icon area of the folder, information about a preset file in the folder; and a processor, configured to subtract, according to the operation that is used to shrink the icon of the folder and obtained by the input apparatus, the preset area to shrink the icon of the folder.

Preferably, that the input apparatus obtains the operation that is used to shrink the icon of the folder includes:

obtaining, by the input apparatus, an operation performed on the preset area, where the operation performed on the preset area is used to shrink the icon of the folder.

Preferably, that the input apparatus obtains the operation that is used to shrink the icon of the folder includes:

obtaining, by the input apparatus, an operation that is used to shrink, in a landscape orientation, the icon of the folder.

That the processor subtracts, according to the operation that is used to shrink the icon of the folder and obtained by the input apparatus, the preset area includes:

subtracting, by the processor, the preset area according to the operation that is used to shrink, in a landscape orientation, the icon of the folder and obtained by the input apparatus.

Preferably, that the input apparatus obtains the operation that is used to shrink the icon of the folder includes:

obtaining, by the input apparatus, an operation that is used to shrink, in a portrait orientation, the icon of the folder.

That the processor subtracts, according to the operation that is used to shrink the icon of the folder and obtained by the input apparatus, the preset area includes:

subtracting, by the processor, the preset area according to the operation that is used to shrink, in a portrait orientation, the icon of the folder and obtained by the input apparatus.

Preferably, that the input apparatus obtains the operation that is used to shrink the icon of the folder includes:

obtaining, by the input apparatus, a sliding operation of sliding from the preset area to an icon area of the folder except the preset area.

That the processor subtracts, according to the operation that is used to shrink the icon of the folder and obtained by the input apparatus, the preset area includes:

shrinking, by the processor, the icon area of the folder according to the sliding operation obtained by the input apparatus, where a shrunk icon area of the folder is an area obtained by subtracting the preset area from the icon area, before the shrinking, of the folder.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The above provides a detailed description of a method and terminal for opening a file in a folder according to the embodiments of the present invention, where specific examples are applied in this specification to illustrate a principle and implementation manners of the present invention. The description of the foregoing embodiments merely helps understand the method and core ideas of the present invention. In addition, for a person skilled in the art, based on an idea of the present invention, a modification may be made to a specific implementation manner and an application range. In conclusion, content of this specification shall not be construed as a limitation to the present invention.

What is claimed is:

1. A method for opening a file in a folder, comprising:
displaying a folder icon on a screen of a terminal device, wherein the folder icon corresponds to a folder containing a first application icon corresponding to a first application and a second application icon corresponding to a second application, the first application icon being displayed in a first display area of the folder icon, the second application icon being displayed in a second display area of the folder icon, and wherein a first size of the first application icon is relatively greater than a second size of the second application icon;
detecting available space around a user interface position on which the folder icon is located, wherein detecting the available space includes detecting available space on two sides of a landscape orientation or a portrait orientation of a user interface position on which the folder icon is located;
extending the folder icon toward the available space when the detected available space is greater than or equal to a set threshold, wherein an extended icon area of the folder comprises the first display area;
displaying, in the first display area, the first application icon;
in response to obtaining a first touch input performed on the first display area of the folder icon, opening the first application; and
in response to obtaining a second touch input performed on the second display area of the folder icon, opening the folder and displaying the first application icon and the second application icon on the screen of the terminal device.

2. The method according to claim 1, wherein the folder comprises a third application icon corresponding to a third application, and the third application icon being displayed in the second display area of the folder icon.

3. The method according to claim 1, wherein the extending the folder icon toward the available space when the detected available space is greater than or equal to a set threshold comprises:
when the detected available space is greater than or equal to the set threshold, determining whether the folder comprises the first application icon; and
if it is determined that the folder comprises the first application icon, extending the folder icon toward the available space.

4. The method according to claim 1, wherein before the detecting available space around a user interface position on which the folder icon is located, the method further comprises:
obtaining an operation that is used to extend the folder icon; and
wherein the detecting available space around a user interface position on which the folder icon is located comprises:

detecting, according to the operation that is used to extend the folder icon, the available space around the user interface position on which the folder icon is located.

5. A terminal, comprising:
a touch screen;
at least one processor; and
a non-transitory computer-readable storage medium coupled to the at least one processor and storing programming instructions for execution by the at least one processor, the programming instructions instruct the at least one processor to perform operations comprising:
displaying a folder icon on the touch screen of the terminal, wherein the folder icon corresponds to a folder containing a first application icon corresponding to a first application and a second application icon corresponding to a second application, the first application icon being displayed in a first display area of the folder icon, the second application icon being displayed in a second display area of the folder icon, and wherein a first size of the first application icon is relatively greater than a second size of the second application icon;
detecting available space around a user interface position on which the folder icon is located, wherein detecting the available space includes detecting available space on two sides of a landscape orientation or a portrait orientation of a user interface position on which the folder icon is located;
extending the folder icon toward the available space when the detected available space is greater than or equal to a set threshold, wherein an extended icon area of the folder comprises the first display area;
displaying, in the first display area, the first application icon;
in response to obtaining a first touch input performed on the first display area of the folder icon, opening the first application; and
in response to obtaining a second touch input performed on the second display area of the folder icon, opening the folder and displaying the first application icon and the second application icon on the touch screen of the terminal.

6. The terminal according to claim 5, wherein the extending the folder icon toward the available space when the detected available space is greater than or equal to a set threshold comprises:
when the detected available space is greater than or equal to the set threshold, determining whether the folder comprises the first application icon; and
if it is determined that the folder comprises the first application icon, extending the folder icon toward the available space.

7. The terminal according to claim 5, wherein the operations comprise:
obtaining an operation that is used to extend the folder icon; and
wherein the detecting available space around a user interface position on which the folder icon is located comprises: detecting, according to the operation that is used to extend the folder icon, the available space around the user interface position on which the folder icon is located.

8. The terminal according to claim 5, wherein the folder contains a third application icon corresponding to a third application, and the third application icon being displayed in the second display area of the folder icon.

* * * * *